(12) United States Patent
Wang et al.

(10) Patent No.: US 10,997,463 B2
(45) Date of Patent: May 4, 2021

(54) TRAINING TEXT RECOGNITION SYSTEMS

(71) Applicant: Adobe Inc., San Jose, CA (US)

(72) Inventors: Zhaowen Wang, San Jose, CA (US);
Hailin Jin, San Jose, CA (US); Yang Liu, Cambridge (GB)

(73) Assignee: Adobe Inc., San Jose, CA (US)

( * ) Notice: Subject to any disclaimer, the term of this patent is extended or adjusted under 35 U.S.C. 154(b) by 227 days.

(21) Appl. No.: 16/184,779

(22) Filed: Nov. 8, 2018

(65) Prior Publication Data
US 2020/0151503 A1 May 14, 2020

(51) Int. Cl.
G06K 9/62 (2006.01)
G06K 9/32 (2006.01)
G06K 9/34 (2006.01)

(52) U.S. Cl.
CPC ......... G06K 9/6256 (2013.01); G06K 9/3258 (2013.01); G06K 9/344 (2013.01); G06K 9/6202 (2013.01); G06K 2209/015 (2013.01)

(58) Field of Classification Search
CPC .................................................. G06K 9/6256
See application file for complete search history.

(56) References Cited

U.S. PATENT DOCUMENTS

| | | | | |
|---|---|---|---|---|
| 9,412,052 B1 * | 8/2016 | Natarajan | ................. | G06K 9/40 |
| 10,163,022 B1 * | 12/2018 | Cho | ........................ | G06N 3/08 |
| 2010/0166318 A1 * | 7/2010 | Ben-Horesh | ........... | G06K 9/685 |
| | | | | 382/195 |
| 2016/0210532 A1 * | 7/2016 | Soldevila | .............. | G06K 9/3258 |
| 2018/0157927 A1 * | 6/2018 | He | .......................... | G06K 9/342 |
| 2018/0181805 A1 * | 6/2018 | Asl | .......................... | G06K 9/62 |
| 2018/0189604 A1 * | 7/2018 | Zhang | .................. | G06K 9/6262 |
| 2019/0138860 A1 * | 5/2019 | Liu | .......................... | G06K 9/66 |
| 2020/0053119 A1 * | 2/2020 | Schnieders | ........... | H04L 63/101 |
| 2020/0089998 A1 * | 3/2020 | Zagaynov | ............... | G06T 5/007 |

OTHER PUBLICATIONS

"The FreeType Project", Retrieved at: https://www.freetype.org/— on Aug. 2, 2018, 12 pages.
Almazan,"Word Spotting and Recognition with Embedded Attributes", Nov. 5, 2014, 17 pages.
(Continued)

Primary Examiner — Wen W Huang
(74) Attorney, Agent, or Firm — Fig. 1 Patents

(57) ABSTRACT

In implementations of recognizing text in images, text recognition systems are trained using noisy images that have nuisance factors applied, and corresponding clean images (e.g., without nuisance factors). Clean images serve as supervision at both feature and pixel levels, so that text recognition systems are trained to be feature invariant (e.g., by requiring features extracted from a noisy image to match features extracted from a clean image), and feature complete (e.g., by requiring that features extracted from a noisy image be sufficient to generate a clean image). Accordingly, text recognition systems generalize to text not included in training images, and are robust to nuisance factors. Furthermore, since clean images are provided as supervision at feature and pixel levels, training requires fewer training images than text recognition systems that are not trained with a supervisory clean image, thus saving time and resources.

20 Claims, 8 Drawing Sheets

(56) References Cited

OTHER PUBLICATIONS

Berthelot,"BEGAN: Boundary Equilibrium Generative Adversarial Networks", May 31, 2017, 10 pages.
Bissacco,"PhotoOCR: Reading Text in Uncontrolled Conditions", IEEE Inti Conference on Computer Vision (ICCV), Dec. 2013, 8 pages.
Cheng,"Focusing Attention: Towards Accurate Text Recognition in Natural Images", Oct. 17, 2017, 9 pages.
Ghosh,"Visual attention models for scene text recognition", Jun. 5, 2017, 9 pages.
Goel,"Whole is Greater than Sum of Parts: Recognizing Scene Text Words", Oct. 2013, 5 pages.
Goodfellow,"Generative Adversarial Nets", In: Advances in neural information processing systems (2014), Jun. 10, 2014, 9 pages.
Gordo,"Supervised Mid-Level Features for Word Image Representation", Nov. 14, 2014, 11 pages.
Graves,"Speech Recognition with Deep Recurrent Neural Networks", in ICASSP, 2013., Mar. 22, 2013, 5 pages.
Graves,"Connectionist Temporal Classification: Labelling Unsegmented Sequence Data with Recurrent Neural Networks", In: Proceedings of the 23rd international conference on Machine learning, ACM (2006), Jun. 25, 2006, 8 pages.
Hochreiter,"Long Short-Term Memory", In Neural computation, 1997, Nov. 15, 1997, 32 pages.
Isola,"Image-to-Image Translation with Conditional Adversarial Networks", 2017 IEEE Conference on Computer Vision and Pattern Recognition (CVPR), Nov. 22, 2017, 17 pages.
Jaderberg,"Deep Structured Output Learning for Unconstrained Text Recognition", Apr. 10, 2015, 10 pages.
Jaderberg,"Synthetic Data and Artificial Neural Networks for Natural Scene Text Recognition", Dec. 9, 2014, 10 pages.
Jaderberg,"Deep Features for Text Spotting", Sep. 2014, 17 pages.
Jaderberg,"Reading Text in the Wild with Convolutional Neural Networks", May 7, 2015, 20 pages.
Karatzas,"ICDAR 2013 Robust Reading Competition", Aug. 2013, 10 pages.
Kingma,"Adam: A Method for Stochastic Optimization", Dec. 22, 2014, 9 pages.
Lee,"Recursive Recurrent Nets with Attention Modeling for OCR in the Wild", Mar. 9, 2016, 10 pages.
Lucas,"ICDAR 2003 Robust Reading Competitions: Entries, Results and Future Directions", Jul. 2005, 48 pages.
Mirza,"Conditional Generative Adversarial Nets", Nov. 6, 2014, 7 pages.
Mishra,"Scene Text Recognition using Higher Order Language Priors", Sep. 2012, 11 pages.
Peng,"Reconstruction-Based Disentanglement for Pose-invariant Face Recognition", Aug. 16, 2017, 15 pages.
Phan,"Recognizing Text with Perspective Distortion in Natural Scenes", Mar. 2014, pp. 569-576.
Risnumawan,"A robust arbitrary text detection system for natural scene images", Jul. 17, 2014, pp. 8027-8048.
Shi,"Robust Scene Text Recognition with Automatic Rectification", Apr. 19, 2016, 9 pages.
Shi,"An End-to-End Trainable Neural Network for Image-based Sequence Recognition and Its Application to Scene Text Recognition", Jul. 21, 2015, 9 pages.
Su,"Accurate Scene Text Recognition based on Recurrent Neural Network", Nov. 2014, 14 pages.
Tran,"Disentangled Representation Learning GAN for Pose-Invariant Face Recognition", 2017 IEEE Conference on Computer Vision and Pattern Recognition (CVPR), Jul. 2017, pp. 1415-1424.
Wang,"End-to-End Text Recognition with Convolutional Neural Networks", Feb. 2013, 5 pages.
Wang,"End-to-End Scene Text Recognition", IEEE Inti Conference on Computer Vision. (ICCV), Nov. 2011, 8 pages.
Yao,"Strokelets: A Learned Multi-Scale Representation for Scene Text Recognition", 2014 IEEE Conference on Computer Vision and Pattern Recognition, Sep. 2014, 8 pages.
Ye,"Text Detection and Recognition in Imagery: A Survey", IEEE transactions on pattern analysis and machine intelligence, Jun. 2015, 24 pages.
Yim,"Rotating Your Face Using Multi-task Deep Neural Network", 2015 IEEE Conference on Computer Vision and Pattern Recognition (CVPR), Oct. 2015, pp. 676-684.
Yin,"Text Detection, Tracking and Recognition in Video: A Comprehensive Survey", IEEE Transactions on Image Processing, vol. 25, No. 6, Jun. 2016, pp. 2752-2771.
Zhou,"EAST: An Efficient and Accurate Scene Text Detector", Jul. 10, 2017, 10 pages.
Zhu,"Scene Text Detection and Recognition: Recent Advances and Future Trends", Jun. 2015, 19 pages.

* cited by examiner

TRAINING TEXT RECOGNITION SYSTEMS

BACKGROUND

Text recognition systems recognize text in images, such as an image of a natural scene including text (e.g., an image of a highway sign), and are used in a variety of applications, including autonomous driving, robots (e.g., autonomous parking lot attendants), drones, aiding visually-impaired persons, keyword parsing of a document, advertisement recommendation for mobile clients, and the like. Because images with text can be synthetically generated (e.g., using an image renderer that introduces nuisance factors to perturb text of an image), text recognition systems are often trained with training datasets that contain large numbers of synthetically-generated text images, such as by comparing text predicted by the text recognition system with ground truth text supplied to the text recognition system.

The performance of text recognition systems, however, is usually limited to recognizing those words included in training images used to train the text recognition system, so that words not included in a training dataset used to train the text recognition system may not be properly recognized by the text recognition system. Consequently, the number of images in a training dataset is usually very large, and may include multiple images with different nuisance factors for each word in a language. For instance, a training dataset may require hundreds of thousands of images to train a convolutional neural network of a text recognition system with each training class corresponding to a word of the English language. Accordingly, training a text recognition system requires significant effort, in terms of manual resources to design and select a training dataset, and computer resources to process the images of the training dataset to train the text recognition system, requiring a significant amount of time.

Moreover, text recognition systems are often not robust to some nuisance factors, such as the introduction of compression artifacts, additive noise processes, geometric distortion (e.g., warping or deformation of text), and the like. Adding training images to a training database to include additional nuisance factors, like different geometric distortions, increases the time and effort needed to train a text recognition system by increasing the resources needed to manage and process a training dataset.

SUMMARY

Techniques, systems, and devices are described to train a text recognition system to recognize text in images. Text recognition systems are trained not only with synthetic images of a training dataset that include text perturbed by nuisance factors (e.g., noisy images), but also with clean images that include clean text. For instance, a clean image may correspond to a synthetic image of a training dataset, but have some or all nuisance factors removed, such as by removing a perspective warp introduced in a training image. A clean image acts as supervision at both feature and pixel levels, so that a text recognition system is trained to be feature invariant (e.g., by requiring features extracted from a noisy image to match features extracted from a clean image), and feature complete (e.g., by requiring that features extracted from a noisy image be sufficient to generate a clean image). At the feature level, a feature discriminator is adversarially trained against a feature encoder using features extracted from a noisy image and features extracted from a clean image by the feature encoder. At the pixel level, an image discriminator is adversarially trained against a feature encoder and image generator using the clean image and a reconstructed clean image generated with the image generator from features extracted from the noisy image by the feature extractor. The image discriminator generates a confidence score that indicates a quality of text prediction across a dimension (e.g., horizontally) of the prediction of the text, and can be used to detect and correct errors in a prediction of text. Accordingly, a text recognition system trained by the techniques, systems, and devices described herein is not limited to recognizing text in an image that corresponds to text of a training image, but can generalize to text not included in training images used to train the text recognition system, since the text recognition system is trained to be feature complete. Moreover, a text recognition system trained by the techniques, systems, and devices described herein is robust to nuisance factors, since the text recognition system is trained to be feature invariant. Furthermore, since a clean image is provided as supervision at feature and pixel levels using adversarially-trained discriminators, a text recognition system trained by the techniques, systems, and devices described herein can be trained using fewer training images than text recognition systems that are trained without a supervisory clean image, thus saving time and resources.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
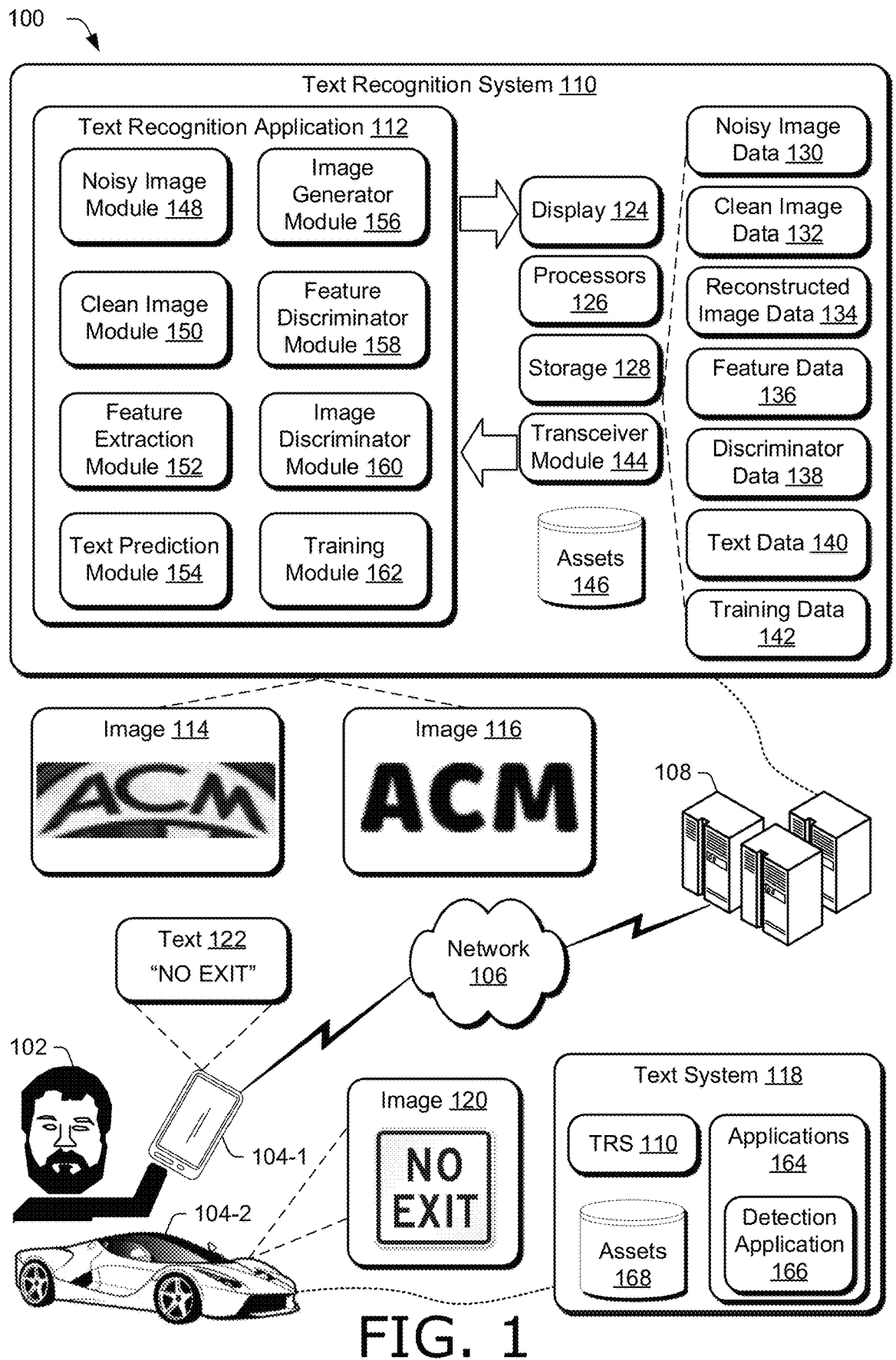
FIG. 1 illustrates a digital medium environment in an example implementation that is operable to employ techniques described herein.

Text recognition systems can be used in many different situations to recognize text in an image, such as autonomous driving (e.g., by recognizing street signs and guiding an automobile), robots (e.g., autonomous parking lot attendants), drones, aiding visually-impaired persons, keyword parsing of a document, advertisement recommendation for mobile clients, and the like. Text recognition systems are often trained with training datasets that contain large numbers of synthetically-generated text images, e.g., noisy images including text perturbed by one or more nuisance factors, such as compression artifacts, additive noise processes, geometric distortion, and the like. For instance, a training dataset may include hundreds of thousands of noisy images to train a convolutional neural network of a text recognition system with each training class corresponding to a word of the English language. Hence, training a text recognition system can require significant resources, such as manual resources to design and select a training dataset, and computer resources to process the images of the training dataset to train the text recognition system. Moreover, text recognition systems are often not robust to some nuisance factors, such as compression artifacts and geometric deformation of text, and adding additional training images to a training dataset for these nuisance factors exacerbates the amount of resources needed when using large training datasets.

Accordingly, this disclosure describes systems, techniques, and devices for training a text recognition system not only with noisy images of a training dataset that include text perturbed by nuisance factors, but also with supervisory clean images that include clean text, thereby reducing the number of images needed to train a text recognition system and making the text recognition robust to nuisance factors. A clean image may correspond to a synthetic image of a training dataset, but have some or all nuisance factors removed, such as by removing a perspective warp introduced in a synthetically-generated training image. A clean image acts as supervision at both feature and pixel levels, so that a text recognition system is trained to be feature invariant and feature complete.

A text recognition system is trained to be feature invariant by requiring features extracted from a training image (e.g., a noisy image) with a feature encoder to match features extracted from a clean image with the feature encoder. The feature encoder can extract any suitable features from an image, such as a feature map. A feature discriminator is adversarially trained against the feature encoder using features extracted from the training image and features extracted from the clean image. For instance, the feature discriminator outputs a respective binary feature label for each feature map provided to it as input, attempting to distinguish between noisy inputs (e.g., features extracted from the training image) and clean inputs (e.g., features extracted from the clean image). The feature encoder and feature discriminator are trained adversarially in a minimax style using a feature adversarial loss term determined from respective binary labels for features extracted from the training image and features extracted from the clean image.

A text recognition system is trained to be feature complete by requiring that all text label information is extracted by the feature encoder from an image. This requirement is equivalent to requiring the existence of an image generator that can generate a clean image from features extracted from a noisy image. Hence, an image generator receives features extracted from a training image using a feature encoder, and generates a reconstructed clean image. At the pixel level, an image discriminator is adversarially trained against the feature encoder and the image generator using the clean image and the reconstructed clean image. For instance, the image discriminator outputs a respective binary image label for each image provided to it as input, attempting to distinguish between a reconstructed clean image generated by the image generator and a clean image rendered from a ground truth text string. The feature encoder and image generator are trained adversarially against the image discriminator in a minimax style using an image adversarial loss term determined from respective binary labels for a clean image and reconstructed clean image.

In one example, an image discriminator generates a confidence score from the image adversarial loss term that indicates a quality of text prediction across a dimension of a prediction of text. For instance, a text prediction module may predict text of an image from features extracted from an image by a feature encoder, and the image discriminator may generate a confidence score between zero and one across a horizontal dimension of the text prediction. Hence, each letter of a text prediction may be assigned one or more confidence scores across the width of the letter, which can be used to detect and correct errors. In one example, a text recognition system includes a post-processing step that receives a text prediction generated by the text recognition system, and detects, corrects, or detects and corrects errors based on a confidence score generated from an image adversarial loss term.

Additionally or alternatively, a text recognition system can be trained with a loss term constructed from a weighted sum of loss terms, including a feature adversarial loss term as discussed above, an image adversarial loss term as discussed above, a feature-matching loss term determined from a difference of a first feature map (e.g., a feature map corresponding to a noisy image) and a second feature map (e.g., a feature map corresponding to a clean image), an image-reconstruction loss term determined from a difference of a reconstructed clean image and a clean image, and a training loss term determined from a conditional probability of a ground truth text string given a prediction of text based on features extracted from an image.

Accordingly, a text recognition system trained by the techniques, systems, and devices described herein is robust to nuisance factors and is not limited to recognizing text in an image that corresponds to text of a training image, but can generalize to text not included in training images used to train the text recognition system, since the text recognition system is trained to be feature invariant and feature complete. Furthermore, since a clean image is provided as supervision at feature and pixel levels, a text recognition system trained by the techniques, systems, and devices described herein can be trained using fewer training images than text recognition systems that are not trained with a supervisory clean image, thus saving time and resources.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a user 102 having at least one computing device. In the example in FIG. 1, user 102 is illustrated as having two computing devices, computing device 104-1 and computing device 104-2 (collectively computing devices 104). For instance, computing device 104-1 depicts a smart phone, and computing device 104-2 depicts a vehicle to indicate that computing device 104-2 is a vehicular computing device, such as an autonomous driving system of a vehicle. Computing devices 104 are example computing devices, and any suitable computing device is contemplated, such as a mobile phone, tablet, laptop computer, desktop computer, gaming device, goggles, glasses, camera, digital assistant, wearable device (e.g., watch, arm-band, adhesive patch, etc.), echo device, image editor, non-linear editor, digital audio workstation, copier, scanner, vehicle, drone, and the like that may include an application to recognize text in images. Furthermore, discussion of one of computing devices 104 is not limited to that computing device, but generally applies to each of the computing devices 104. Moreover, computing devices 104 may range from full resource devices with substantial memory and processor resources (e.g., personal computers, game consoles) to a low-resource device with limited memory or processing resources (e.g., mobile devices).

Various types of input devices and input instrumentalities can be used to provide input to computing devices 104. For example, computing devices 104 can recognize input as being a mouse input, stylus input, touch input, input provided through a natural user interface, user gestures on a touchscreen, combinations thereof, and the like. Thus, computing devices 104 can recognize multiple types of gestures including touch gestures and gestures provided through a natural user interface. In one example, computing devices 104 include speech recognition, identification, and synthesis functionalities, microphones, and speakers that allow computing devices 104 to communicate with user 102 in a conversation. Moreover, computing devices 104 can include an image capture device (e.g., a camera) configured to capture images and video streams.

Figure 8:
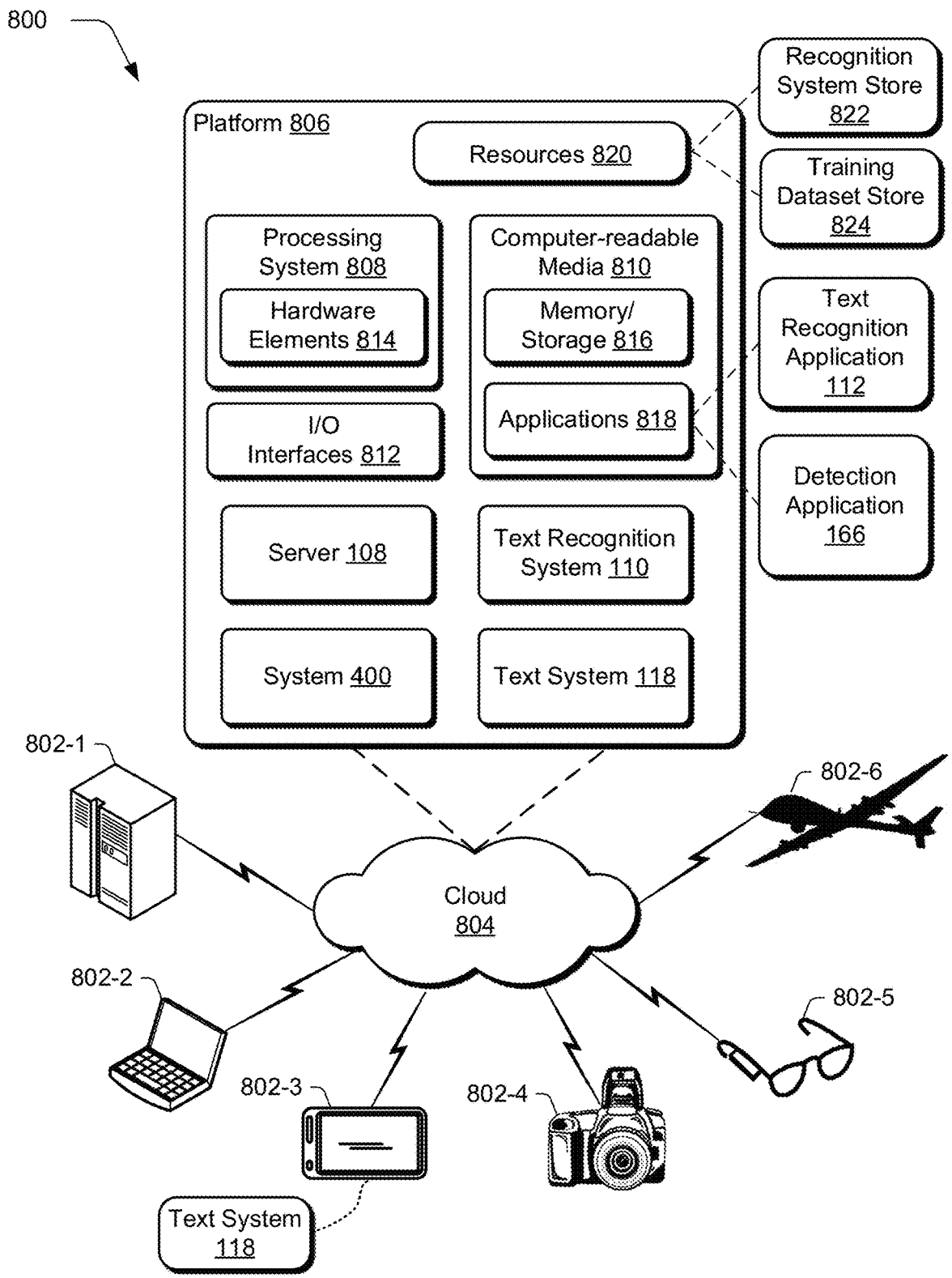
FIG. 8 illustrates an example system including various components of an example device that can be implemented as any type of computing device as described and/or utilized with reference to FIGS. 1-7 to implement aspects of the techniques described herein.

Furthermore, computing devices 104 may be representative of one or a plurality of different devices, such as one or more devices connected to a network that perform operations "over the cloud" as further described in relation to FIG. 8. In one example, computing devices 104 are communicatively coupled to each other, such as with a low power wireless communication standard (e.g., a Bluetooth® protocol). For instance, computing device 104-1 can communicate wirelessly with computing device 104-2. Hence, results of an image processed on one device (e.g., computing device 104-1) can be communicated to, and displayed on another device (e.g., computing device 104-2).

Computing devices 104 are also coupled to network 106. Network 106 communicatively couples computing devices 104 with server 108. For clarity, only computing device 104-1 is illustrated in FIG. 1 as coupled to network 106, though computing device 104-2 can also be coupled to server 108 via network 106. Network 106 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Server 108 may include one or more servers or service providers that provide services, resources, or combinations thereof to computing devices 104. In one example, resources provided by server 108 may be licensed, purchased, or may be made freely available, (e.g., without authentication, license, or account-based access). The resources can include any suitable combination of services and content, such as made available over network 106 by one or more providers. Some examples of services include, but are not limited to, an on-line shopping service, a photo editing service, an image database service (e.g., a service providing training images from a database), a pre-trained model service (e.g., a service providing text recognition models that have been pre-trained to recognize text in images), a web development and management service, a collaboration service, a social networking service, a messaging service, an advertisement service, a graphics design service, an image storage service (including storage and access of photos, documents, records, files, and the like), and so forth. Content may include various combinations of assets, including videos, ads, audio, multimedia streams, animations, images, training images, web documents, web pages, applications, device applications, text documents, drawings, presentations, stock photographs, user profiles, user preferences, user data (e.g., images stored in an image gallery), and the like.

In the example in FIG. 1, server 108 includes text recognition system 110, which includes text recognition application 112 (discussed below in more detail). Text recognition system 110 also includes image 114 and image 116. Image 114 is an example of a noisy image, such as a training image that is synthetically generated by rendering image 114 with nuisance factors based on a ground truth text string. For instance, a ground truth text string for image 114 and image 116 may include the text "ACM", and image 114 can be rendered by applying any suitable rendering parameters to an image renderer provided the ground truth text string. Image 114 may be rendered with rendering parameters that include a font type, text style (e.g., bold, italics, etc.), font size, etc., and any suitable nuisance factors that perturb the text rendered in image 114, such as rotation, background shadows, sensor noise, compression artifacts, additive noise processes, geometric distortion (e.g., warping or deformation of text), combinations thereof, and the like.

Image 116 is an example of a clean image. Image 116 can be generated in any suitable way, such as by rendering image 116 based on a ground truth text string according to rendering parameters used to render image 114. In one example, image 116 is rendered with the same rendering parameters such as font type, text style, and font size as image 114, without nuisance factors applied to image 116. Additionally or alternatively, image 116 can be rendered by removing one or more nuisance factors applied to image 114.

Image 114 and image 116 are examples of images used to train text recognition system 110 to recognize text in images. For instance, image 114 is a noisy image and image 116 is a clean image that serves as supervision to train text recognition system 110. Parts of text recognition system 110 that have been pre-trained by server 108 using image 114 and image 116, such as a feature encoder and text decoder of text recognition system 110, can be provided to one of computing devices 104 via network 106 to recognize text in images. Accordingly, computing devices 104 include text system 118. For clarity, only computing device 104-2 is illustrated as including text system 118, though computing device 104-1 also includes a copy of text system 118.

In the example in FIG. 1, text system 118 includes a pre-trained text recognition system obtained from server 108 (e.g., a feature encoder and text decoder). Computing device 104-2 obtains image 120, indicated by a street sign in FIG. 1. In one example, computing device 104-2 includes an imaging device, such as a camera, that obtains image 120. Image 120 may be a stand-alone image, or an image in a video sequence of images. Using a pre-trained text recognition system of text system 118 provided by server 108, computing device 104-2 recognizes text included in image 120 and generates a text prediction 122. Text prediction 122 includes the text "NO EXIT", corresponding to the text of image 120. Computing device 104-2 may use text prediction 122 to autonomously control the driving of a vehicle that includes computing device 104-2, such as to operate the vehicle without input of user 102. For instance, computing device 104-2 may determine that based on image 120 and text prediction 122, the vehicle is prevented from exiting at an approaching exit while the vehicle is driving, and alert user 102 in any suitable way. In one example, computing device 104-2 communicates text prediction 122 to computing device 104-1, such as with a low-energy communication link, and computing device 104-1 displays text prediction 122 in a user interface to alert user 102. In one example, computing device 104-2 displays text prediction 122 in a heads-up-display of a vehicle. Additionally or alternatively, computing device 104-2 may adjust a speed of the vehicle, a position of the vehicle (e.g., change lanes on a freeway), and the like. In one example, computing device 104-2 synthesizes an audio file including speech of text prediction 122, and plays back the audio file via a speaker, thereby alerting user 102 to the text of image 120.

Text recognition system 110 includes display 124. Display 124 can be any suitable type of display, such as a liquid crystal display, plasma display, head-mounted display, projector and screen, a touchscreen that recognizes user gestures (e.g., touch gestures), and the like. A touchscreen of display 124 can include any suitable type of touchscreen, such as a capacitive touchscreen, a resistive touchscreen, a surface acoustic wave touchscreen, an infrared touchscreen, an optical imaging touchscreen, an acoustic pulse recognition touchscreen, combinations thereof, and the like. Moreover, display 124 can display any suitable interface.

Text recognition system 110 also includes processors 126. Processors 126 can include any suitable type and number of processors. Hence, text recognition system 110 may be implemented at least partially by executing instructions stored on storage 128 on processors 126. For instance, processors 126 may execute portions of text recognition application 112.

Storage 128 can be any suitable type of storage accessible by or contained in text recognition system 110. Storage 128 stores and provides access to and from memory included in storage 128 for any suitable type of data. For instance, storage 128 includes noisy image data 130, including data associated with noisy images, such as training images, rendering parameters, nuisance factors applied to an image, an order nuisance factors are applied, inverse parameters for nuisance factors that can be applied to remove a respective nuisance factor, an image size, a ground truth text string, a format of an image (e.g., a file format), an image identifier in a sequence of images, such as a training dataset or video sequence, thumbnail images of training images, combinations thereof, and the like.

Storage 128 also includes clean image data 132, including data associated with clean images, such as a ground truth text string, rendering parameters (e.g., font style and size, italics, bold, etc.), nuisance factors removed from a noisy image, an order nuisance factors are removed, inverse parameters of nuisance factors removed from a noisy image, nuisance factors applied to a clean image, an order nuisance factors are applied to a clean image, an image size, a format of an image (e.g., a file format), an image identifier, combinations thereof, and the like.

Storage 128 also includes reconstructed image data 134, including data associated with reconstructed clean images, such as reconstructed clean images generated by an image generator of text recognition system 110, parameters of an image generator used to generate a reconstructed clean image (e.g., a state, values of weights, architecture configuration, etc. of an image generator), features used to generate a reconstructed clean image (e.g., features extracted from a noisy image), a value of an image-reconstruction loss term determined from the difference of a reconstructed clean image and a clean image, combinations thereof, and the like.

Storage 128 also includes feature data 136, including data associated with features of images, such as features extracted from noisy images, features extracted from clean images, feature maps, frames of flattened feature maps, probability distributions of frames of feature maps, parameters of a feature encoder used to extract features (e.g., a state, values of weights, architecture configuration, etc. of a feature encoder), a value of a feature-matching loss term determined from the difference of a first feature map (e.g., a feature map extracted from a noisy image) and a second feature map (e.g., a feature map extracted from a clean image), combinations thereof, and the like.

Storage 128 also includes discriminator data 138, including data associated with image discriminators and feature discriminators, such as binary feature labels that indicate whether features input to a feature discriminator are noisy features (e.g., features extracted from a noisy image) or clean features (e.g., features extracted from a clean image), binary image labels that indicate whether images input to an image discriminator are reconstructed clean images or clean images, a value of a feature adversarial loss term determined from respective binary labels for a first feature map (e.g., a feature map extracted from a noisy image) and a second feature map (e.g., a feature map extracted from a clean image), a value of an image adversarial loss term determined from respective binary labels for a reconstructed clean image and a clean image, a confidence score determined from an image adversarial loss term, combinations thereof, and the like.

Storage 128 also includes text data 140, including data associated with text of images, such as a ground truth text string, a text prediction generated by a text decoder of text recognition system 110, a confidence score that indicates a quality of a prediction of text across a dimension of the prediction of the text, such as horizontally, a value of a training loss term determined from a conditional probability of the ground truth text string given the prediction of the text, characters of text determined to be in error, characters of text corrected by text recognition system 110, combinations thereof, and the like.

Storage 128 also includes training data 142, including data associated with text of images, such as training losses computed while training a text recognition system (e.g., a feature-matching loss term, a feature adversarial loss term, an image-reconstruction loss term, an image adversarial loss term, and a training loss term), combining weights of loss terms, indicators of images of a training dataset used to train a text recognition system, rendering parameters used to synthesize noisy images, nuisance factors applied to an image to perturb text of an image, combinations thereof, and the like.

Furthermore, text recognition system 110 includes transceiver module 144. Transceiver module 144 is representative of functionality configured to transmit and receive data using any suitable type and number of communication protocols. For instance, data within text recognition system 110 may be transmitted from server 108 with transceiver module 144, such as from server 108 to one of computing devices 104. Furthermore, data can be received at server 108 with transceiver module 144. In one example, transceiver module 144 includes a low power wireless communication standard (e.g., a Bluetooth® protocol) for communicating data between computing devices.

Text recognition system 110 also includes assets 146. In one example, assets 146 are stored in storage 128. Assets 146 can include any suitable asset used or generated by text recognition system 110. In one example, assets 146 include parts of text recognition systems that have been trained to recognize text in images, such as a feature encoder and text decoder. Hence, pre-trained feature encoders and text decoders of assets 146 can be provided from server 108 to computing devices 104 via network 106 and used in any suitable application to recognize text in images, such as image 120.

Text recognition system 110 also includes text recognition application 112. Text recognition application 112 includes noisy image module 148, clean image module 150, feature extraction module 152, text prediction module 154, image generator module 156, feature discriminator module 158, image discriminator module 160, and training module 162. These modules work in conjunction with each other to train text recognition systems to recognize text in images, such as a feature encoder of feature extraction module 152 and a text decoder of text prediction module 154.

Noisy image module 148 is representative of functionality configured to obtain a noisy image, such as a noisy image including text based on a ground truth text string. Noisy image module 148 can obtain any suitable noisy image in any suitable way. In one example, noisy image module 148 synthesizes a noisy image to include text of the ground truth text string according to rendering parameters that include canonical parameters and nuisance factors. Canonical parameters describe how the text is to be rendered in the absence of nuisance factors, such as font type, text style (e.g., italics, bold, superscript, subscript, etc.), font size, and the like. Nuisance factors describe perturbations that can be applied to an image, such as shading, color variations, perspective warping, geometric deformations, additive noise (e.g., sensor noise), compression artifacts (e.g., pixelization), and the like. In one example, noisy image module 148 synthesizes noisy images by randomly sampling canonical parameters and nuisance factors, such as uniformly, and applying the randomly-sampled canonical parameters and nuisance factors to synthesize the noisy image.

Additionally or alternatively, noisy image module 148 can obtain noisy images from a database of images, such as a database including a training dataset of training images that include text. In one example, training data 142 includes a database of training datasets of images that include text. Images of a training dataset may include metadata including rendering parameters, such as canonical parameters and nuisance factors used to synthesize the images, an order nuisance factors were applied to a noisy image, a size of an image (e.g., a resolution in number of pixels), a date an image was generated, a format of an image (e.g., a file format), an image identifier in a sequence of images, such as a video sequence or a training dataset, a thumbnail version of an image, and the like.

In one example, noisy image module 148 resizes a noisy image. Noisy image module 148 can resize a noisy image in any suitable way, such as by cropping the image so that the noisy image includes substantially only text, and removing background portions that do not include text. For instance, noisy image module 148 may draw a bounding box around text of an image, and crop the image to include only the bounding box.

Noisy images obtained by noisy image module 148, along with any suitable information, such as a source location of an image, a file format of an image, an indication whether the image is related to other images, such as a sequence number in a training dataset or video sequence, image metadata, rendering parameters, nuisance factors, a thumbnail version of an image, a ground truth text string, and the like, used by or calculated by noisy image module 148 are stored in noisy image data 130 of storage 128 and made available to modules of text recognition application 112. In one example, noisy image module 148 synthesizes a noisy image according to rendering parameters and a ground truth text string, and provides the noisy image to feature extraction module 152.

Clean image module 150 is representative of functionality configured to determine a clean image including text. Clean image module 150 can determine any suitable clean image in any suitable way. In one example, clean image module 150 determines a clean image by removing at least one nuisance factor from a noisy image to form the clean image. For instance, clean image module 150 may obtain a noisy image synthesized by noisy image module 148, including metadata describing nuisance factors used to generate the noisy image, and form a clean image from the noisy image by removing one of the nuisance factors described in the metadata of the noisy image.

Additionally or alternatively, clean image module 150 may synthesize a clean image without applying one or more nuisance factors that were applied to a noisy image. For instance, clean image module 150 may obtain a noisy image synthesized by noisy image module 148, including metadata describing canonical parameters and nuisance factors used to generate the noisy image, and synthesize a clean image according to the canonical parameters, with one or more of the nuisance factors zeroed. In one example, clean image module 150 obtains a clean image by synthesizing the clean image without nuisance factors (e.g., all nuisance factors are zeroed) based on a ground truth text string used by noisy image module 148 to synthesize a noisy image. Clean image module 150 may synthesize the clean image with the same canonical parameters used by noisy image module 148 to synthesize the noisy image. Hence, text of a clean image generated by clean image module 150 may be in a same font, size, style, etc. as text of a noisy image generated by noisy image module 148. An example of a noisy image generated by noisy image module 148 and various clean images generated by clean image module 150 that correspond to the noisy image are illustrated in to FIG. 2.

Figure 2:
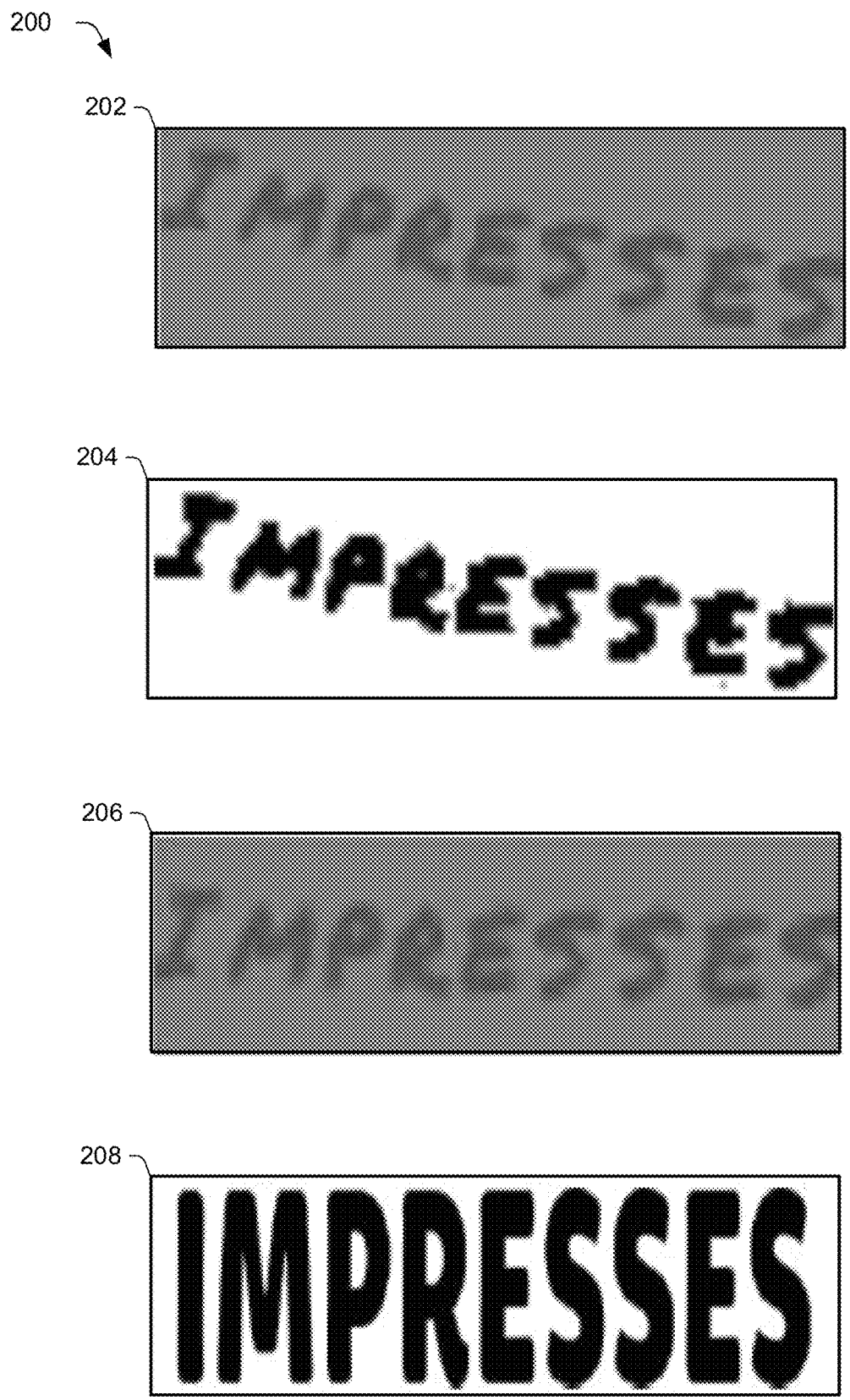
FIG. 2 illustrates example images in accordance with one or more aspects of the disclosure.

FIG. 2 illustrates example images 200 in accordance with one or more aspects of the disclosure. Images 200 includes noisy image 202 and three clean images corresponding to noisy image 202, including clean image 204, clean image 206, and clean image 208. Noisy image 202 is an example of a noisy image obtained by noisy image module 148. For instance, noisy image 202 is synthesized to include the ground truth text string "IMPRESSES" according to multiple nuisance factors, including background shadow, rotation, compression, and additive noise.

Clean image 204, clean image 206, and clean image 208 are examples of clean images generated by clean image module 150 that correspond to noisy image 202. For instance, clean image 204 is a binarized version of noisy image 202 in which the nuisance factor of the background shadow has been removed, and clean image 206 is a deskewed version of noisy image 202 in which the nuisance factor of the rotation has been removed. Clean image 208 is synthesized based on the ground truth text string without nuisance factors, so that the text of clean image 208 is not perturbed by nuisance factors.

Noisy image 202, together with any one of clean image 204, clean image 206, or clean image 208, can be used as a training pair of images to train a text recognition system, such as text recognition system 110 in FIG. 1. A clean image serves as supervision at the feature level and pixel level. Relative performance in terms of recognition accuracy of a text recognition system trained with image pairs including a noisy image and a clean image is illustrated below in Table 1 for a dataset of images.

TABLE 1

Comparison of Recognition Results for Different Clean Images

| Clean Image | Recognition Accuracy (%) |
|---|---|
| None | 80.8 |
| Binarized | 85.8 |
| Deskewed | 84.7 |
| No Nuisance Factors | 87.0 |

Table 1 illustrates that when no clean image is used for training supervision, a recognition accuracy of 80.8 percent is achieved. However, when a binary version of a noisy image is obtained by removing a background shadow (as in clean image 204) and used as a supervising clean image, recognition accuracy improves by five percent to 85.8 percent. When a deskewed version of a noisy image is obtained by removing a rotation (as in clean image 206) and used as a supervising clean image, recognition accuracy improves to 84.7 percent. However, when a clean image is synthesized without nuisance factors (as in clean image 208) and used as a supervising clean image, recognition accuracy improves significantly to 87.0 percent. Accordingly, the addition of a clean image to a noisy image as a supervisory input to control feature-level and pixel-level matching during training improves the recognition accuracy of the text recognition system.

Returning to FIG. 1, clean images obtained by clean image module 150, along with any suitable information, such as a source location of an image, a file format of an image, an indication whether the image is related to other images, such as a sequence number in a training dataset or video sequence of images, image metadata, rendering parameters, canonical parameters, nuisance factors, a thumbnail version of an image, and the like, used by or calculated by clean image module 150 are stored in clean image data 132 of storage 128 and made available to modules of text recognition application 112. In one example, clean image module 150 synthesizes a clean image according to rendering parameters and a ground truth text string, and provides the clean image to feature extraction module 152 and image discriminator module 160.

Feature extraction module 152 is representative of functionality configured to extract features from images. In one example, feature extraction module 152 extracts features of a noisy image obtained by noisy image module 148 into a first feature map, and extracts features of a clean image obtained by clean image module 150 into a second feature map.

Feature extraction module 152 can extract features from an image in any suitable way. In one example, feature extraction module 152 includes a feature encoder, E, that extracts a feature map from an image. Feature encoder, E, can include any suitable encoder, such as a fully convolutional neural network that extracts a three-dimensional (3D) feature map from an input image provided to it. Earlier layers of the convolutional neural network may extract low-level features, such as edges and corners, and later layers of the convolutional neural network may extract finer-level features, such as texture.

A feature map generated by feature extraction module 152 may be provided to text prediction module 154. In one example, feature extraction module 152 extracts a 3D feature map f from an image, such as a noisy image obtained by noisy image module 148, and transforms the 3D feature map into a sequence of feature frames $\{f^1, f^2, \ldots f^N\}$ by flattening N feature segments sliced from f horizontally (e.g., from left to right). Each feature frame $f^n$, $n=1 \ldots N$, corresponds to a local region of the input image which may contain one or more parts of a text glyph. Feature extraction module 152 may provide the sequence of feature frames for a feature map to text prediction module 154, which predicts text of the input image from the sequence of feature frames through beam search (discussed below in more detail).

A feature encoder, E, of feature extraction module 152 can be trained with any suitable loss term. In one example, a feature encoder, E, is trained to minimize a feature-matching loss term determined from a difference of a first feature map extracted from a noisy image (e.g., a noisy image obtained by noisy image module 148) and a second feature map extracted from a clean image (e.g., a clean image obtained by clean image module 150). For instance, a feature encoder, E, may be trained according to a feature-matching loss term $\mathcal{L}_f$, or $$\min_E \mathcal{L}_f = \|E(x) - E(\bar{x})\|_2$$

where x denotes a noisy image and $\bar{x}$ denotes a clean image, and $E(\bullet)$ denotes a feature map extracted from an image with feature encoder E. Since the noisy image and the clean image share a same text label (e.g., they may both be synthesized from a same ground truth text string), the feature-matching loss term serves to train the feature encoder, E, to be feature invariant.

Features extracted by feature extraction module 152, along with any suitable information, such as a feature map, a sequence of feature frames, a value of a feature-matching loss term, parameters of a feature encoder used to extract features (e.g., a state, values of weights, architecture configuration, etc. of a feature encoder), and the like, used by or calculated by feature extraction module 152 are stored in feature data 136 of storage 128 and made available to modules of text recognition application 112. In one example, feature extraction module 152 extracts features of a noisy image into a first feature map, extracts features of a clean image into a second feature map, and provides the first feature map to feature discriminator module 158, text prediction module 154, and image generator module 156, and the second feature map to feature discriminator module 158.

Text prediction module 154 is representative of functionality configured to generate a prediction of text. Text prediction module 154 can generate a prediction of text in any suitable way. In one example, text prediction module 154 includes a text decoder, T, that generates a prediction of text based on a feature map provided by feature extraction module 152. A feature encoder, E, of feature extraction module 152 and a text decoder, T, of text prediction module 154 form an encoder-decoder structure representing a deep neural network.

A text decoder, T, of text prediction module 154 can be any suitable text decoder. In one example, a text decoder, T, of text prediction module 154 includes a two-layer bidirectional long-short term memory (BLSTM) network that predicts text by solving a sequence labeling problem. The text decoder, T, may receive a sequence of feature frames $\{f^1, f^2, \ldots f^N\}$ of a feature map from feature extraction module 152, as discussed above. Text decoder, T, can predict a character probability distribution $\pi^n$, n=1 . . . N, based on the dependency among the feature frames. In one example, the probability space of $\pi^n$ includes all English alphanumeric characters and a blank token for word separation. Text decoder, T, can translate the sequence of per-frame character probability distributions $\{\pi^1, \pi^2, \ldots \pi^N\}$ into a prediction of text of an image, $\hat{y}$, in any suitable way, such as through beam search.

A text decoder, T, of text prediction module 154 can be trained according to any suitable loss term. In one example, a text decoder, T, of text prediction module 154 and a feature encoder, E, of feature extraction module 152 are jointly trained according to a training loss term determined from a conditional probability of a ground truth text string given the prediction of text. For instance, a text decoder, T, and a feature encoder, E, can be jointly trained by minimizing the discrepancy between the probability sequence $\{\pi^1, \pi^2, \ldots \pi^N\}$ and a ground truth text string, y, using a connectionist temporal classification technique (CTC) as described in "Connectionist temporal classification: labelling unsegmented sequence data with recurrent neural networks", *Proceedings of the 23rd international conference on machine learning, ACM*, pp. 369-376, 2006, by A. Graves et al., the disclosure of which is incorporated herein by reference in its entirety. A CTC technique aligns the variable-length character sequence of y with the fixed-length probability sequence so that the conditional probability of y given $\hat{y}$ can be evaluated based on the probability sequence $\{\pi^1, \pi^2, \ldots \pi^N\}$. Accordingly, a text decoder, T, and a feature encoder, E, can be jointly trained according to a training loss term $\mathcal{L}_y$, or $$\min_{E,T} \mathcal{L}_y = P(y|\hat{y}) = \sum_{\bar{y}:\beta(\bar{y})=y} \prod_{t=1}^{K} \pi^t \cdot \bar{y}^t$$

where $\hat{y}=T(E(x))$ is a prediction of text of an image from text decoder T, $P(\cdot)$ denotes probability, $\beta$ is a CTC mapping for sequences of length K, and $\bar{y}^t$ denotes a t-th token in $\bar{y}$.

In one example, a text decoder, T, of text prediction module 154 and a feature encoder, E, of feature extraction module 152 that have been pre-trained are provided to one of computing devices 104 to recognize text in images. For instance, text system 118 may receive a pre-trained text decoder, T, and a pre-trained feature encoder, E, from server 108 as part of a text recognition system to recognize text in images, such as to generate text prediction 122 from image 120.

A prediction of text generated by text prediction module 154, along with any suitable information, such as a feature map, a sequence of feature frames, a value of a feature-matching loss term, parameters of a feature encoder used to extract features (e.g., a state, values of weights, architecture configuration, etc. of a feature encoder), and the like, used by or calculated by text prediction module 154 are stored in text data 140 of storage 128 and made available to modules of text recognition application 112. In one example, text prediction module 154 provides a prediction of text to training module 162. Additionally or alternatively, text prediction module 154 may expose a prediction of text in a user interface.

Image generator module 156 is representative of functionality configured to generate a reconstructed clean image from features extracted by feature extraction module 152. Image generator module 156 can generate a reconstructed clean image in any suitable way. In one example, image generator module 156 includes an image generator, G, that generates a reconstructed clean image, $\hat{x}$, from a feature map extracted from a noisy image, x, obtained by noisy image module 148, so that the reconstructed clean image can be expressed as $\hat{x}=G(E(x))$.

An image generator, G, of image generator module 156 can generate a reconstructed clean image in any suitable way. In one example, an image generator, G, of image generator module 156 includes a deconvolutional neural network to generate a reconstructed clean image from a feature map. For feature completeness, image generator, G, is trained to generate a reconstructed clean image that matches a clean image obtained by clean image module 150, ensuring that features extracted by feature extraction module 152 include all text information (e.g., the extracted features are complete). Hence, an image generator, G, of image generator module 156 and a feature encoder, E, can be jointly trained according to an image-reconstruction loss term, $\mathcal{L}_g$, determined from a difference between the reconstructed clean image and the clean image, or $$\min_{E,G} \mathcal{L}_g = \|G(E(x)) - \bar{x}\|_1$$

where x is a noisy image obtained by noisy image module 148, $\bar{x}$ is a clean image obtained by clean image module 150, and $\bar{x}=G(E(x))$ is a reconstructed clean image generated by image generator module 156.

A reconstructed clean image generated by image generator module 156, along with any suitable information, such as a feature map used to generate a reconstructed clean image, a value of an image-reconstruction loss term, parameters of an image generator used to generate a reconstructed clean image (e.g., a state, values of weights, architecture configuration, etc. of an image generator), and the like, used by or calculated by image generator module 156 are stored in reconstructed image data 134 of storage 128 and made available to modules of text recognition application 112. In one example image generator module 156 provides a reconstructed clean image to image discriminator module 160.

Feature discriminator module 158 is representative of functionality configured to distinguish between features extracted from a noisy image and features extracted from a clean image. Feature discriminator module 158 can distinguish between noisy and clean features (e.g., between features extracted from a noisy image and features extracted from a clean image, respectively) using a feature discriminator, $D_F$. For instance, a feature discriminator, $D_F$, of feature discriminator module 158 can be trained adversarially against a feature encoder, E, of feature extraction module 152 in a generative adversarial manner, as described in "Generative adversarial nets", *Advances in neural information processing systems*, pp. 2672-2680, 2014, by I. Goodfellow et al., the disclosure of which is incorporated herein by reference in its entirety.

In one example, a feature discriminator, $D_F$, of feature discriminator module 158 includes a convolutional neural network with binary classification outputs. For instance, feature discriminator module 158 may receive a feature map extracted from an image by feature extraction module 152, and assign a feature binary label for the feature map to indicate whether the feature map was extracted from a noisy image or a clean image. Feature discriminator module 158 can assign any suitable feature binary label, such as a first numerical value to indicate that features are extracted from a noisy image and a second numerical value to indicate that features are extracted from a clean image.

A feature discriminator, $D_F$, of feature discriminator module 158 can be trained adversarially against a feature encoder, E, of feature extraction module 152 in a minimax style according to a feature adversarial loss term, $\mathcal{L}_{fa}$. In one example, a feature adversarial loss term is determined from respective binary labels $D_F(\bullet)$ for a first feature map extracted from a noisy image and a second feature map extracted from a clean image, or $$\min_{E}\max_{D_F} \mathcal{L}_{fa} = \log[D_F(E(\bar{x}))] + \log[1 - D_F(E(x))].$$

Accordingly, clean image $\bar{x}$ serves as supervision at the feature level since the feature discriminator, $D_F$, is trained to distinguish between noisy and clean features.

Binary classification labels generated by feature discriminator module 158 (e.g., feature binary labels), along with any suitable information, such as feature maps used to generate binary labels, a value of a feature adversarial loss term, parameters of a feature discriminator used to generate classification labels (e.g., a state, values of weights, architecture configuration, etc. of a feature discriminator), and the like, used by or calculated by feature discriminator module 158 are stored in discriminator data 138 of storage 128 and made available to modules of text recognition application 112. In one example, feature discriminator module 158 provides respective binary labels generated for a first feature map extracted from a noisy image and a second feature map extracted from a clean image to training module 162.

Image discriminator module 160 is representative of functionality configured to distinguish between clean images and reconstructed clean images. Image discriminator module 160 can distinguish between clean images and reconstructed clean images using an image discriminator, $D_I$. For instance, an image discriminator, $D_I$, of image discriminator module 160 can be trained adversarially against a feature encoder, E, of feature extraction module 152 and an image generator, G, of image generator module 156 in a generative adversarial manner.

In one example, an image discriminator, $D_I$, of image discriminator module 160 includes a convolutional neural network with binary classification outputs. For instance, image discriminator module 160 may receive an image, such as a clean image obtained by clean image module 150 or a reconstructed clean image generated by image generator module 156, and assign a binary label for the image to indicate whether the image is a clean image or a reconstructed clean image (e.g. image binary labels). Image discriminator module 160 can assign any suitable image binary label, such as a first numerical value to indicate that an image is a clean image synthesized by clean image module 150 and a second numerical value to indicate an image is a reconstructed clean image generated by image generator module 156.

An image discriminator, $D_I$, of image discriminator module 160 can be trained adversarially against a feature encoder, E, of feature extraction module 152 and an image generator, G, of image generator module 156 in a minimax style according to an image adversarial loss term, $\mathcal{L}_{ga}$. In one example, an image adversarial loss term is determined from respective binary labels $D_I(\bullet)$ for a reconstructed clean image conditioned on a noisy image and a clean image conditioned on a noisy image, or $$\min_{E,G}\max_{D_I} \mathcal{L}_{ga} = \log[D_I(\bar{x}|x)] + \log[1 - D_I(G(E(x))|x)].$$

Accordingly, clean image $\bar{x}$ serves as supervision at the image level (e.g., at the pixel level) since the image discriminator, $D_I$, is trained to distinguish between clean images and reconstructed clean images.

Image discriminator module 160 also generates a confidence score. Image discriminator module 160 can generate a confidence score in any suitable way. In one example, image discriminator module 160 generates a confidence score from an image adversarial loss term $\mathcal{L}_{ga}$, such as by evaluating the image adversarial loss term at a number of local image regions that may contain part of a text glyph horizontally from left to right along a prediction of text. As an example of a confidence score generated by image discriminator module 160, consider FIG. 3.

Figure 3:
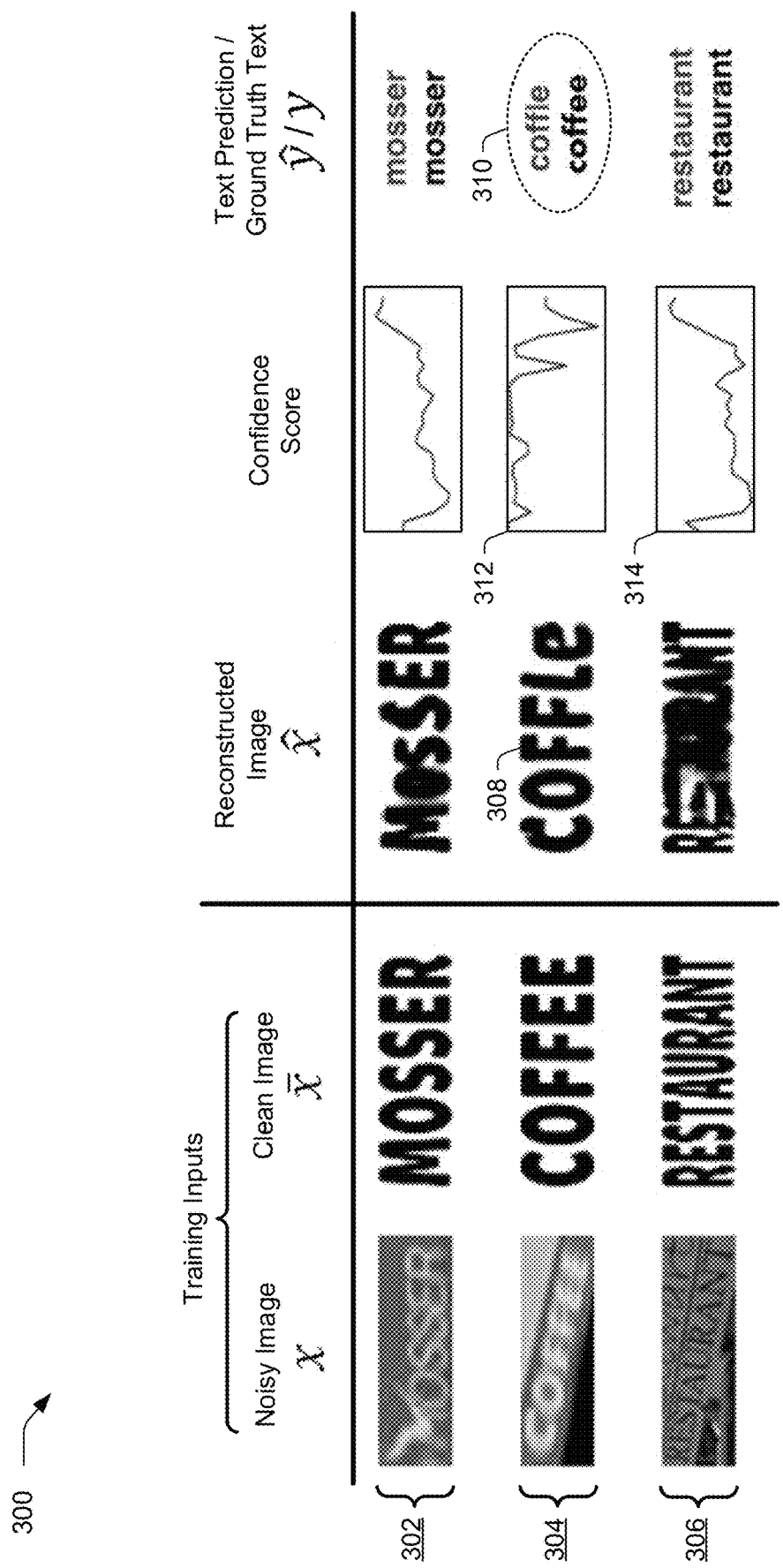
FIG. 3 illustrates example images and example recognition results in accordance with one or more aspects of the disclosure.

FIG. 3 illustrates example images and example recognition results 300 in accordance with one or more aspects of the disclosure. Images and results 300 include three rows representing three examples of input images, output images, and results generated by a text recognition system, such as text recognition system 110 in FIG. 1. Row 302 illustrates an example for the text "MOSSER", row 304 illustrates an example for the text "COFFEE", and row 306 illustrates an example for the text "RESTAURANT".

For each row, training inputs include noisy image x and clean image $\bar{x}$ that can be used to train a text recognition system, such as text recognition system 110 in FIG. 1. Furthermore, a reconstructed clean image $\hat{x}$ is shown for each row, generated by image generator module 156 from features extracted by feature extraction module 152 from noisy image x. A confidence score generated by image discriminator module 160, and a prediction of text generated by text prediction module 154 are also illustrated for each row, together with a ground truth text string.

For row 302 and row 306, the text recognition system correctly predicts the respective text strings "MOSSER" and "RESTAURANT". However, for row 304, due to the extreme distortion of the noisy image, the text recognition system is partly in error in forming a text prediction. For instance, reconstructed clean image 308 does not accurately reflect the text "COFFEE" of the noisy input image, causing the text recognition system to generate a text prediction "COFFLE", rather than "COFFEE" at 310. A confidence score for row 302 is shown at confidence score 312.

Confidence score 312 is a normalized score between zero and one and indicates a degree of confidence across a horizontal dimension of the text prediction. A value of a confidence score close to one indicates a high confidence in the text prediction and that the reconstructed clean image looks realistic, while a value of a confidence score close to zero indicates a low confidence in the text prediction and that the reconstructed clean image looks unrealistic. In the example in FIG. 3, an image adversarial loss term is evaluated at 25 positions across the text prediction to determine 25 values of the confidence score, each normalized between zero and one. Confidence score 312 indicates that confidence is low for the last two letters of the text prediction, since confidence score 312 decreases substantially in these regions. Hence, confidence score 312 matches reconstructed clean image 308, in which the ground truth text is not properly rendered from the features extracted from the nosy input image.

Furthermore, for row 306, confidence score 314 indicates a low confidence in the text prediction, despite the text prediction matching the ground truth text string for "RESTAURANT". Confidence score 314 is low throughout the central region of the text prediction because the reconstructed clean image for "RESTAURANT" is blurry for the middle letters between "R" and "NT".

Accordingly, a confidence score generated by image discriminator module 160 can indicate a reliability of a predicted text string. In one example, text recognition system 110 includes a post-processing step to detect and correct errors in the predicted text string based on the confidence score. For instance, if a confidence score generated by image discriminator module 160 is below a threshold confidence, such as 0.1, for a threshold number of consecutive positions along a dimension of the predicted text, such as six consecutive positions, text recognition system 110 may declare that an error has been detected in the predicted text. In one example, if text recognition system 110 detects an error in the predicted text, text recognition system 110 corrects the error. Text recognition system 110 can correct the error in any suitable way, such as by reprocessing an input noisy image with different weights of a convolutional network, changing a character of a text prediction (e.g., based on other characters of a text prediction that have a high confidence score, text recognition system 110 may determine a correct character to replace an incorrect error), performing a spell check algorithm on the text prediction, combinations thereof, and the like.

Returning again to FIG. 1, binary classification labels generated by image discriminator module 160, along with any suitable information, such as images used to generate binary labels, a value of an image adversarial loss term, confidence scores, parameters of an image discriminator used to generate classification labels (e.g., a state, values of weights, architecture configuration, etc. of an image discriminator), and the like, used by or calculated by image discriminator module 160 are stored in discriminator data 138 of storage 128 and made available to modules of text recognition application 112. In one example, image discriminator module 160 provides respective binary labels generated for a clean image obtained by clean image module 150 and a reconstructed clean image generated by image generator module 156 to training module 162.

As discussed above, the modules of text recognition system 110 can include any suitable neural network or networks. Example parameters of a feature encoder, E, of feature extraction module 152, a text decoder, T, of text prediction module 154, an image generator, G, of image generator module 156, a feature discriminator, $D_F$, of feature discriminator module 158, and an image discriminator, $D_I$, of image discriminator module 160 for an example implementation of text recognition system 110 are illustrated in Table 2.

TABLE 2

Example Parameters of Text Recognition System 110

| Encoder | | | Image Generator | | |
|---|---|---|---|---|---|
| Layer | Filter/Stride | Output Size | Layer | Filter/Stride | Output Size |
| Input | — | 32 × 100 × 3 | FConv7 | 2 × 2/2 × 1 | 2 × 25 × 512 |
| Conv1 | 3 × 3/2 × 2 | 16 × 50 × 64 | FConv6 | 3 × 3/2 × 1 | 4 × 25 × 512 |
| Conv2 | 3 × 3/2 × 2 | 8 × 25 × 128 | FConv5 | 3 × 3/1 × 1 | 4 × 25 × 256 |
| Conv3 | 3 × 3/1 × 1 | 8 × 25 × 256 | FConv4 | 3 × 3/2 × 1 | 8 × 25 × 256 |
| Conv4 | 3 × 3/2 × 1 | 4 × 25 × 256 | FConv3 | 3 × 3/1 × 1 | 8 × 25 × 256 |
| Conv5 | 3 × 3/1 × 1 | 4 × 25 × 512 | FConv2 | 3 × 3/2 × 2 | 16 × 50 × 128 |
| Conv6 | 3 × 3/2 × 1 | 2 × 25 × 512 | | | |
| Conv7 | 2 × 2/2 × 1 | 1 × 25 × 512 | FConv1 | 3 × 3/2 × 2 | 32 × 100 × 3 |

| Feature Discriminator | | | Image Discriminator | | |
|---|---|---|---|---|---|
| Layer | Filter/Stride | Output Size | Layer | Filter/Stride | Output Size |
| ConvF1 | 1 × 1/1 × 1 | 1 × 25 × 256 | ConvI1 | 3 × 3/2 × 2 | 16 × 50 × 64 |
| ConvF2 | 1 × 1/1 × 1 | 1 × 25 × 128 | ConvI2 | 3 × 3/2 × 2 | 8 × 25 × 128 |
| ConvF3 | 1 × 1/1 × 1 | 1 × 25 × 64 | ConvI3 | 3 × 3/2 × 1 | 4 × 25 × 256 |
| ConvF4 | 1 × 1/1 × 1 | 1 × 25 × 32 | ConvI4 | 3 × 3/2 × 1 | 2 × 25 × 256 |
| ConvF5 | 1 × 1/1 × 1 | 1 × 25 × 1 | ConvI5 | 2 × 3/2 × 1 | 1 × 25 × 1 |
| AvgPool | 1 × 25/1 × 1 | 1 × 1 × 1 | AvgPool | 1 × 25/1 × 1 | 1 × 1 × 1 |

| Text Decoder | | |
|---|---|---|
| Layer | Hidden Unit | Output Size |
| BLSTM1 | 256 | 25 × 512 |
| BLSTM2 | 256 | 25 × 512 |
| Output | 37 | 25 × 37 |

Training module 162 is representative of functionality configured to train a text recognition system to recognize image text (e.g., text in an image). Training module 162 can train a text recognition in any suitable way. In one example, training module 162 trains modules of text recognition system 110 based on a combination of loss terms described above, including a feature-matching loss term determined from the difference of a first feature map and a second feature map, a feature adversarial loss term determined from respective binary labels for the first feature map and the second feature map, an image-reconstruction loss term determined from the difference of a reconstructed clean image and a clean image, an image adversarial loss term determined from additional respective binary labels for the reconstructed clean image and the clean image, and a training loss term determined from a conditional probability of a ground truth text string given a prediction of the text.

For instance, training module 162 can train modules of text recognition system 110 according to an overall loss term, $\mathcal{L}$, based on a combination of loss terms described above, or $$\min_{E,T,G,D_I,D_F} \max \mathbb{E}_{x,\bar{x},y}\{\mathcal{L}(x, \bar{x}, y)\}$$

$$\mathcal{L}(x, \bar{x}, y) = \lambda_y \mathcal{L}_y + \lambda_f \mathcal{L}_f + \lambda_g \mathcal{L}_g + \lambda_{ga} \mathcal{L}_{ga} + \lambda_{fa} \mathcal{L}_{fa}$$

where $\mathbb{E}_{x,\bar{x},y}\{\cdot\}$ denotes statistical expectation over training inputs made up of triples x, x̄, y, including a noisy image, a clean image, and a ground truth text string, respectively, and the λ's are combining weights that can be assigned any suitable value, such as a number in a range of numbers (e.g., range [0,10]). In one example, $\lambda_y=\lambda_{ga}=\lambda_{fa}=1$, $\lambda_g=10$, and $\lambda_f=0.001$.

In one example, training module 162 pre-processes an image (e.g., a noisy image, a clean image, or both) before it is provided to text recognition system 110 for training. In one example, training module 162 resizes noisy images obtained by noisy image module 148 to a specified size, such as 32×100 pixels in horizontal and vertical dimensions, respectively. Additionally or alternatively, training module 162 may resize a clean image obtained by clean image module 150, such as to be a same size as a noisy image resized by training module 162. In one example, training module 162 scales image intensities to be within a prescribed range, such as between [−1,1].

Training module 162 can train a text recognition system in any suitable way, such as by generating training updates based on training data and data generated by the text recognition system, and providing the training updates to the text recognition system to update the text recognition system. Training updates may include any suitable update term, such as updates based on a stochastic gradient descent of a cost surface determined from a loss term, such as an overall loss term, $\mathcal{L}$.

Accordingly, training module 162 can train a feature encoder, E, of feature extraction module 152, a text decoder, T, of text prediction module 154, an image generator, G, of image generator module 156, a feature discriminator, $D_F$, of feature discriminator module 158, and an image discriminator, $D_I$, of image discriminator module 160. Training module 162 can train these modules of a text recognition system using not only a noisy image and ground truth text string as training inputs, but also a clean image that serves as supervision at both feature and image levels, to ensure that text recognition system is both feature invariant and feature complete.

Training updates generated by training module 162, along with any suitable information, such as loss terms, confidence scores, combining weights, iteration number, training updates, and the like, used by or calculated by training module 162 are stored in training data 142 of storage 128 and made available to modules of text recognition application 112. In one example, training module 162 provides training updates to a feature encoder, E, of feature extraction module 152, a text decoder, T, of text prediction module 154, an image generator, G, of image generator module 156, a feature discriminator, $D_F$, of feature discriminator module 158, and an image discriminator, $D_I$, of image discriminator module 160.

In the example in FIG. 1, text recognition system 110 trains a text recognition system, such as a text recognition system including text recognition application 112, and provides at least some modules of the trained text recognition system to computing devices 104 for use in a client application. In one example, server 108 provides a pre-trained feature encoder, E, of feature extraction module 152, and a pre-trained text decoder, T, of text prediction module 154 to at least one of computing devices 104. Hence, each of computing devices 104 includes text system 118 that may receive and store a pre-trained text recognition system.

Text system 118 includes applications 164, which can include any suitable application, such as an application configured to be executed by one or more of computing devices 104. Applications 164 includes detection application 166. Detection application 166 can be any application configured to recognize text in an image, such as an image editing application, a vehicular application (e.g., a guidance system in a self-driving car), a control system of a robot or drone, an image cataloging application, and the like.

Text system 118 also includes assets 168. Assets 168 can include any suitable asset used by text system 118, such as pre-trained text recognition systems provided by server 108, training databases, combinations thereof, and the like. Text system 118 also includes a copy of text recognition system 110 of server 108. Hence, though in the example of FIG. 1 text recognition system 110 of server 108 is described as training a text recognition system and providing it to one of computing devices 104, computing devices 104 can additionally or alternatively train a text recognition system. A text recognition system trained by text system 118 (e.g., using a copy of text recognition system 110), can be stored in assets 168 and made available to any suitable application, such as detection application 166. In one example, one of computing devices 104 trains a text recognition system using text system 118, and provides the trained text recognition system to another device of computing devices 104. For instance, computing device 104-1 may train a text recognition system and provide it to computing device 104-2 to be used to recognize text in images.

Having considered an example digital medium environment, consider now a discussion of example systems in accordance with one or more aspects of the disclosure.

Example Text Recognition Systems

Figure 4:
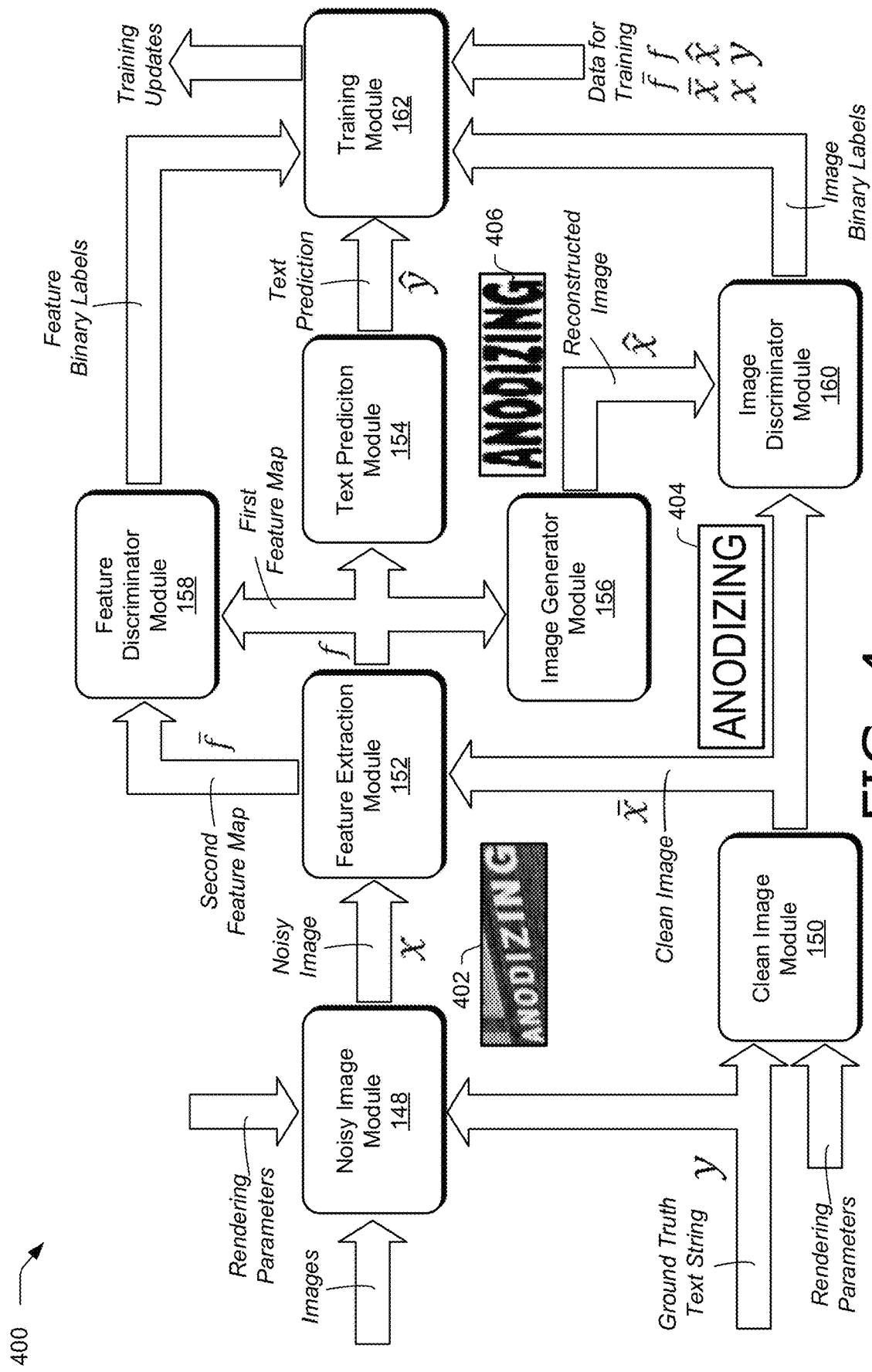
FIG. 4 illustrates an example system in accordance with one or more aspects of the disclosure.

FIG. 4 illustrates an example system 400 in accordance with one or more aspects of the disclosure. In this implementation, system 400 includes the modules of text recognition application 112 as described in FIG. 1, e.g., noisy image module 148, clean image module 150, feature extraction module 152, text prediction module 154, image generator module 156, feature discriminator module 158, image discriminator module 160, and training module 162. System 400 is one example of text recognition system 110 that can be constructed using the modules of text recognition application 112. For instance, signals can be redefined, and modules can be modified, combined, divided, added, or removed to form a modified system, without altering the functionality of system 400. Accordingly, such modified systems are considered to be within the scope of the disclosure.

Furthermore, for simplicity system 400 is limited to the modules of text recognition application 112 and a description of some of their interconnects. System 400 can, however, include any suitable signals and communications between modules omitted for simplicity. Such signals may include system clocks, counters, image indicators, feature map indicators, image identification numbers, reset signals, and the like. In one example, system 400 can operate in real time (e.g., with no perceptible delay to a user) to generate a text prediction given an input image. Accordingly, signals can be calculated by the modules of system 400 and communicated between the modules of system 400 without significant delay. In one example, system 400 trains modules of system 400 to recognize text in images. Additionally or alternatively, system 400 can generate detection results including a text prediction for a user-provided input image, such as an image that is not part of a training dataset used to train modules of system 400.

Moreover, system 400 can be implemented on any suitable device or devices. In one example, system 400 is implemented on one computing device (e.g., server 108 or one of computing devices 104 in FIG. 1). In another example, system 400 is implemented on more than one computing device. For instance, parts of system 400 can be implemented by a first computing device, such as computing device 104-1 or server 108 in FIG. 1, and other parts of system 400 can be implemented by an additional computing device or devices, such as computing device 104-2. In one example, a server implements parts of system 400, such as server 108 in FIG. 1. A server can be remote, e.g., because it is not collocated with the first computing device. A server may be configured to receive signals of system 400 from a computing device (e.g., one or more of computing devices 104), process the received signals, such as with text recognition system 110, and transmit results of the processing back to the computing device. Hence, text recognition system 110 of server 108 in FIG. 1 may include system 400. In one example, system 400 is used to train an adaptive model (e.g., neural network, machine learning model, and the like) of a text recognition system by a first computing device, such as by server 108, and the trained adaptive model is supplied by the first computing device to a different computing device, such as one of computing devices 104. For instance, server 108 may provide a pre-trained feature encoder, E, and pre-trained text decoder, T, to one of computing devices 104.

Noisy image module 148 obtains a noisy image, x. Noisy image module 148 can obtain a noisy image in any suitable way. In one example, noisy image module 148 synthesizes a noisy image with an image renderer to include text of a ground truth text string, y. For instance, noisy image module 148 may synthesize a noisy image according to rendering parameters, including canonical parameters that designate how to render text without nuisance factors (e.g., according to a font style and size), and nuisance factors that designate distortions and imperfections that are applied to text of a noisy image, such as compression artifacts, geometric distortion (e.g., warping), shadows, noise, and the like.

Additionally or alternatively, noisy image module 148 may obtain a plurality of images from a database of images, such as a database including one or more training datasets that can be used to train a text recognition system, such as system 400, to recognize text in images. For instance, noisy image module 148 may obtain images of a training dataset that include text perturbed by nuisance factors. In one example, noisy image module 148 obtains images that are not part of a training dataset, such as an image captured by a camera of a vehicle that is supplied as input to a text recognition system of an autonomous guidance system for the vehicle.

Noisy image module 148 provides a noisy image, x to feature extraction module 152. An example noisy image is illustrated in FIG. 4 at image 402. Image 402 includes the text "ANODIZING" that has been distorted by one or more nuisance factors, including a rotation and a distortion of the text, and an additive background.

Clean image module 150 obtains a clean image, $\bar{x}$. Clean image module 150 can obtain any suitable clean image in any suitable way. In one example, clean image module 150 renders a clean image using an image rendered according to a ground truth text string, y that is also used to render a noisy image with noisy image module 148. A clean image may be rendered without nuisance factors, such as based on canonical parameters with nuisance factors zeroed.

Additionally or alternatively, a clean image obtained by clean image module 150 may include one or more nuisance factors. For instance, clean image module 150 may obtain a clean image by removing one or more nuisance factors from a noisy image generated by noisy image module 148, so that the clean image may include one or more nuisance factors of the noisy image that are not removed in the clean image. In one example, clean image module 150 removes all nuisance factors from a noisy image to generate a clean image without nuisance factors.

Additionally or alternatively, clean image module 150 can obtain rendering parameters used to render a noisy image by noisy image module 148, and synthesize a clean image according to the rendering parameters that corresponds to the noisy image. For instance, clean image module 150 may remove, zero, or otherwise disable one or more rendering parameters used to render a noisy image to render a clean image corresponding to the noisy image.

Clean image module 150 provides a clean image, $\bar{x}$, to feature extraction module 152 and image discriminator module 160. An example clean image is illustrated in FIG. 4 at image 404. Image 404 includes the text "ANODIZING" that has rendered without nuisance factors, so that the text is not distorted.

Feature extraction module 152 receives a noisy image, x, from noisy image module 148 and a clean image, $\bar{x}$, from clean image module 150. Feature extraction module 152 extracts features from an image into a feature map. For instance, feature extraction module 152 may include a feature encoder, E, to extract features from an image into a feature map. In the example in FIG. 4, feature extraction module 152 extracts features from a noisy image into a first feature map, f, and features from a clean image into a second feature map, $\bar{f}$.

Feature extraction module 152 provides a first feature map, f, extracted from a noisy image a second feature map, $\bar{f}$, extracted from a clean image to feature discriminator module 158. Feature extraction module 152 also provides a first feature map, f, extracted from a noisy image to text prediction module 154 and image generator module 156.

Text prediction module 154 receives a first feature map, f, extracted from a noisy image from feature extraction module 152, and generates a text prediction, $\hat{y}$, of the ground truth text, y. Text prediction module 154 can generate a text prediction in any suitable way. In one example, text prediction module 154 includes a text decoder, T, that generates a prediction of text, such as decoder of a deep neural network configured as an encoder-decoder structure.

In one example, text prediction module 154 receives a sequence of feature frames of a feature map from feature extraction module 152, and predicts a sequence of probability distributions for the feature frames over a probability space, such as a probability space of all alphanumeric characters of a language and a blank token for word separation. Text prediction module 154 may translate the sequence of probability distributions into a text prediction, $\hat{y}$, through beam search.

Text prediction module 154 provides a text prediction, $\hat{y}$, to training module 162. In the example in FIG. 4, a text prediction generated by text prediction module 154 corresponding to the noisy image denoted by image 402 may include the text "ANODIZING" (not shown in FIG. 4).

Image generator module 156 receives a first feature map, f, extracted from a noisy image from feature extraction module 152, and generates a reconstructed clean image, $\hat{x}$, from the first feature map. In one example, image generator module 156 includes an image generator, G, that generates an image from a feature map, such as deconvolutional neural network.

Image generator module 156 provides a reconstructed clean image, x̂, to image discriminator module 160. An example reconstructed clean image is illustrated in FIG. 4 at image 406. Image 406 includes the text "ANODIZING" that has been generated from features extracted from noisy image, x.

Feature discriminator module 158 receives a first feature map, f, extracted from a noisy image a second feature map, f̄, extracted from a clean image. For each feature map provided to feature discriminator module 158, feature discriminator module 158 generates a feature binary label that classifies the input feature map as belonging to one of a noisy image or a clean image. For instance, feature discriminator module 158 includes a feature discriminator, $D_F$, that is adversarially trained against a feature encoder, E, of feature extraction module 152 in a generative adversarial manner. Feature discriminator module 158 provides respective feature binary labels for first feature map and second feature map inputs to training module 162.

Image discriminator module 160 receives a clean image, x̄, from clean image module 150 and a reconstructed clean image, x̂, from image generator module 156. For each image provided to image discriminator module 160, image discriminator module 160 generates an image binary label that classifies the input image as one of a clean image or a reconstructed clean image. For instance, image discriminator module 160 includes an image discriminator, $D_I$, that is adversarially trained against a feature encoder, E, of feature extraction module 152 and an image generator, G, in a conditional generative adversarial manner. Image discriminator module 160 provides respective image binary labels for clean image and reconstructed clean image inputs to training module 162.

Training module 162 receives respective feature binary labels for a first feature map and a second feature map from feature discriminator module 158, and respective image binary labels for a clean image and a reconstructed clean image from image discriminator module 160. Training module 162 also receives a prediction of text, ŷ, from text prediction module 154. Training module 162 also receives data for training. Data for training can include any suitable data to train a text recognition system, including data used by or calculated by system 400, such as feature maps generated by feature extraction module 152, a clean image synthesized by clean image module 150, a reconstructed clean image generated by image generator module 156, a noisy image obtained by noisy image module 148, a ground truth text string (e.g., a ground truth text string included in metadata of a noisy image obtained by noisy image module 148), and the like.

Training module 162 evaluates a loss function using any suitable data, such as data for training used by or calculated by system 400. Training module 162 can evaluate any suitable loss term, such as overall loss term, $\mathcal{L}$, described above, using any suitable values for combining weights λ. For instance, training module 162 may evaluate a loss term including a weighted sum of a feature-matching loss term determined from the difference of a first feature map and a second feature map, a feature adversarial loss term determined from respective binary labels for the first feature map and the second feature map, an image-reconstruction loss term determined from the difference of the reconstructed clean image and the clean image, an image adversarial loss term determined from additional respective binary labels for the reconstructed clean image and the clean image, and a training loss term determined from a conditional probability of the ground truth text string given the prediction of the text. Additionally or alternatively, one or more of these loss terms may be zeroed when forming a loss function, such as by setting a combining weight to zero.

Based on evaluating a loss function, training module 162 generates training updates. Training module 162 can generate training updates according to a loss function in any suitable way. In one example, training module 162 generates training updates by stochastic gradient descent of a loss function. Training updates generated by training module 162 are used by modules of system 400 to update the modules in any suitable way, such as by adjusting coefficients in a neural network.

Training module 162 provides training updates to any suitable module of system 400. In one example, training module 162 provides training updates to a feature encoder, E, of feature extraction module 152 and an image generator, G, of image generator module 156, a text decoder, T, of text prediction module 154, a feature discriminator, $D_F$, of feature discriminator module 158, and an image discriminator, $D_I$, of image discriminator module 160.

The systems described herein constitute an improvement over systems that do not train text recognition systems using clean images as conditional inputs. Rather, the systems described herein include text recognition systems that are trained using both noisy images of text and a corresponding clean image. A clean image acts as supervision at both feature and pixel levels, so that a text recognition system is trained to be feature invariant (e.g., by requiring features extracted from a noisy image to match features extracted from a clean image), and feature complete (e.g., by requiring that features extracted from a noisy image be sufficient to generate a clean image). At the feature level, a feature discriminator is adversarially trained against a feature encoder. At the pixel level, an image discriminator is adversarially trained against a feature encoder and image generator. The image discriminator generates a confidence score that indicates a quality of a text prediction across a dimension (e.g., horizontally) of the prediction of the text, and can be used to detect and correct errors in a prediction of text.

Accordingly, text recognition systems trained by the systems described herein are not limited to recognizing text in an image that corresponds to text of a training image, but can generalize to text not included in training images, since the text recognition systems are trained to be feature complete. Moreover, text recognition systems trained by the systems described herein are robust to nuisance factors, since the text recognition systems are trained to be feature invariant. Furthermore, since a clean image is provided as supervision at feature and pixel levels using adversarially-trained discriminators, a text recognition system trained by the systems described herein can be trained using fewer training images than text recognition systems that are not trained with a supervisory clean image, thus saving time and resources.

Having considered example systems, consider now a discussion of example procedures for recognizing text in images in accordance with one or more aspects of the disclosure.

Example Procedures

Figure 5:
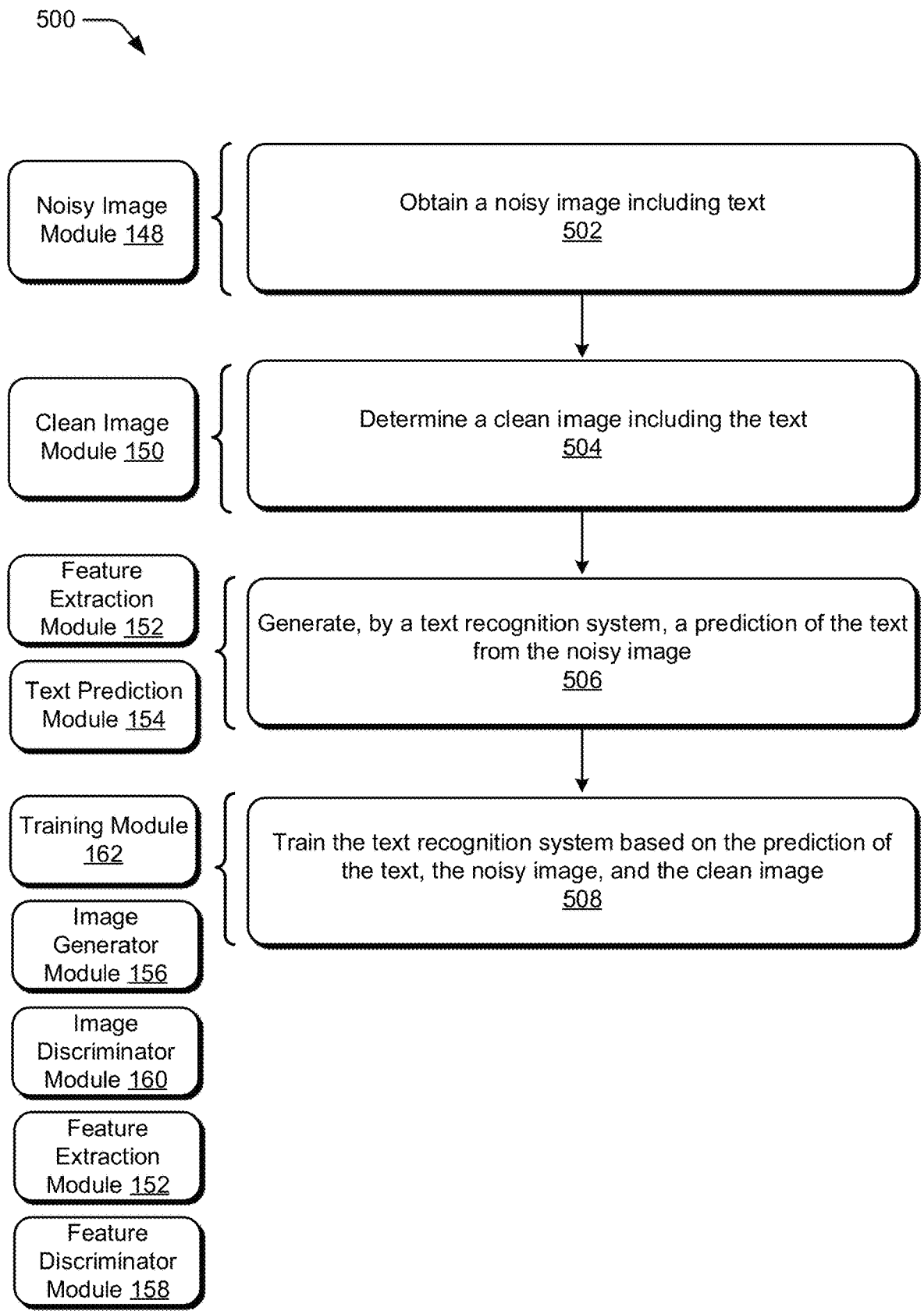
FIG. 5 illustrates a flow diagram depicting an example procedure in accordance with one or more aspects of the disclosure.

FIG. 5 illustrates an example procedure 500 for recognizing text in images in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 104 or server 108 of FIG. 1 that makes use of a text recognition system, such as system 400 in FIG. 4, or text recognition system 110 in FIG. 1. A text recognition system implementing procedure 500 may be an independent application that has been installed on the computing device, a service hosted by a service provider that is accessible by the computing device, a plug-in module to the computing device, or combinations thereof.

A noisy image including text is obtained (block 502). In one example, noisy image module 148 obtains a noisy image. Additionally or alternatively, the noisy image can be obtained by synthesizing the noisy image according to one or more nuisance factors based on a ground truth text string.

A clean image including the text is determined (block 504). In one example, clean image module 150 determines a clean image. Additionally or alternatively, the clean image can be determined by removing at least one of the one or more nuisance factors from the noisy image to form the clean image. In one example, the clean image is obtained by synthesizing the clean image without nuisance factors based on a ground truth text string.

A prediction of the text is generated by a text recognition system from the noisy image (block 506). In one example, feature extraction module 152 and text prediction module 154 are included in the text recognition system and generate a prediction of the text from the noisy image. For instance, feature extraction module 152 may provide a sequence of feature frames to text prediction module 154, which generates a text prediction from the sequence of feature frames.

The text recognition system is trained based on the prediction of the text, the noisy image, and the clean image (block 508). In one example, training module 162, image generator module 156, image discriminator module 160, feature extraction module 152, and feature discriminator module 158 train the text recognition system based on the prediction of the text, the noisy image, and the clean image. For instance, training module 162 may jointly train these modules according to an overall loss $\mathcal{L}(x, \bar{x}, y)$.

In one example, first features are extracted from the noisy image with a feature encoder of the text recognition system, and second features are extracted from the clean image with the feature encoder. The training includes updating the feature encoder based on a feature-matching loss term determined from a difference between the first features and the second features.

Additionally or alternatively, the updating includes providing the first features to a feature discriminator to assign a first binary label for the first features, providing the second features to the feature discriminator to assign a second binary label for the second features, forming a feature adversarial loss term based on the first binary label and the second binary label, and training the feature encoder adversarially against the feature discriminator based on the feature adversarial loss term.

In one example, first features are extracted from the noisy image with a feature encoder of the text recognition system, and a reconstructed clean image is generated with an image generator from the first features. The training includes updating the feature encoder jointly with the image generator based on an image-reconstruction loss term determined from a difference between the reconstructed clean image and the clean image.

Additionally or alternatively, the updating includes providing the reconstructed clean image to an image discriminator to assign a first binary label for the reconstructed clean image, providing the clean image to the image discriminator to assign a second binary label for the clean image, forming an image adversarial loss term based on the first binary label and the second binary label, and training the feature encoder and the image generator adversarially against the image discriminator based on the image adversarial loss term.

In one example, features are extracted from the noisy image into a feature map with a feature encoder of the text recognition system, and a text decoder of the text recognition system generates the prediction of the text from the noisy image based on the feature map. The training includes updating the feature encoder and the text decoder jointly based on a training loss term determined from a conditional probability of a ground truth text string given the prediction of the text.

Additionally or alternatively, at least part of the trained text recognition system is provided to a different device than the computing device for recognizing a text occurrence in one or more images. For instance, a pre-trained feature encoder and a pre-trained text decoder may be provided from a server to a client device to use in the client device to recognize text in images.

Figure 6:
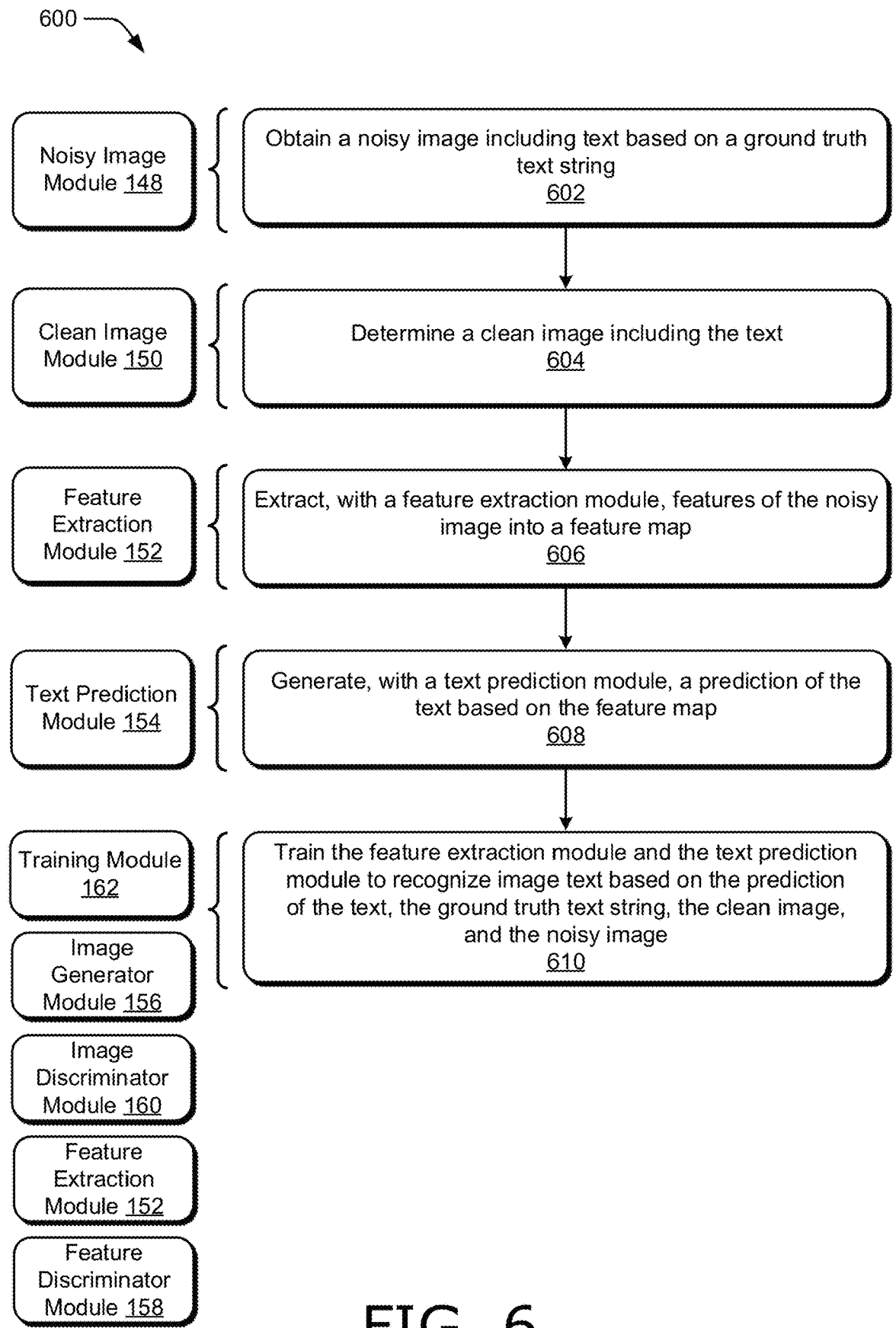
FIG. 6 illustrates a flow diagram depicting an example procedure in accordance with one or more aspects of the disclosure.

FIG. 6 illustrates an example procedure 600 for recognizing text in images in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 104 or server 108 of FIG. 1 that makes use of a text recognition system, such as system 400 in FIG. 4, or text recognition system 110 in FIG. 1. A text recognition system implementing procedure 600 may be an independent application that has been installed on the computing device, a service hosted by a service provider that is accessible by the computing device, a plug-in module to the computing device, or combinations thereof.

A noisy image including text based on a ground truth text string is obtained (block 602). In one example, noisy image module 148 obtains a noisy image including text based on a ground truth text string. For instance, noisy image module 148 may synthesize a noisy image to include text of a ground truth text string and add nuisance factors to the noisy image, such as compression artifacts and sensor noise.

A clean image including the text is determined (block 604). In one example, clean image module 150 determines a clean image including the text. For instance, clean image module 150 may obtain a clean image from a database of images, or synthesize a clean image.

In one example, the noisy image is obtained by synthesizing the noisy image according to one or more nuisance factors based on the ground truth text string, and the clean image is determined by removing at least one of the one or more nuisance factors from the noisy image to form the clean image, or synthesizing the clean image without nuisance factors based on the ground truth text string in a standard font.

Features of the noisy image are extracted into a feature map (block 606). In one example, feature extraction module 152 extracts features of the noisy image into a feature map. Feature extraction module 152 may flatten a feature map to generate a sequence of feature frames. For instance, a sequence of feature frames may be generated by flattening a plurality of feature segments sliced from a feature map horizontally (e.g., from left to right).

A prediction of the text is generated based on the feature map (block 608). In one example, text prediction module 154 generates a prediction of the text based on the feature map. Text prediction module 154 may generate a prediction of text a sequence of feature frames of a feature map.

The feature extraction module and the text prediction module are trained to recognize image text based on the prediction of the text, the ground truth text string, the clean image, and the noisy image (block 610). In one example, training module 162, image generator module 156, image discriminator module 160, feature extraction module 152, and feature discriminator module 158 train the feature extraction module and the text prediction module to recognize image text based on the prediction of the text, the ground truth text string, the clean image, and the noisy image.

In one example, the feature extraction module extracts additional features from the clean image, and to train the feature extraction module includes updating a feature encoder based on a feature-matching loss term determined from a difference between the features and the additional features.

Additionally or alternatively, a feature discriminator module can receive the features and the additional features, and assign respective binary labels for the features and the additional features. The training module can be configured to train the feature extraction module adversarially against the feature discriminator module based on a feature adversarial loss term determined from the respective binary labels.

In one example, an image generator module is configured to generate a reconstructed clean image from the feature map, and the training module is configured to update the feature extraction module jointly with the image generator module based on an image-reconstruction loss term determined from a difference between the reconstructed clean image and the clean image.

Additionally or alternatively, an image discriminator module is configured to receive the reconstructed clean image and the clean image, and assign respective binary labels for the reconstructed clean image and the clean image. The training module can be configured to train the feature extraction module and the image generator module adversarially against the image discriminator module based on an image adversarial loss term determined from the respective binary labels. In one example, the image discriminator module generates a confidence score from the image adversarial loss term that indicates a quality of the prediction of the text across a dimension of the prediction of the text.

In one example, to train the feature extraction module and the text prediction module includes updating the feature extraction module and the text prediction module jointly based on a training loss term determined from a conditional probability of the ground truth text string given the prediction of the text.

Figure 7:
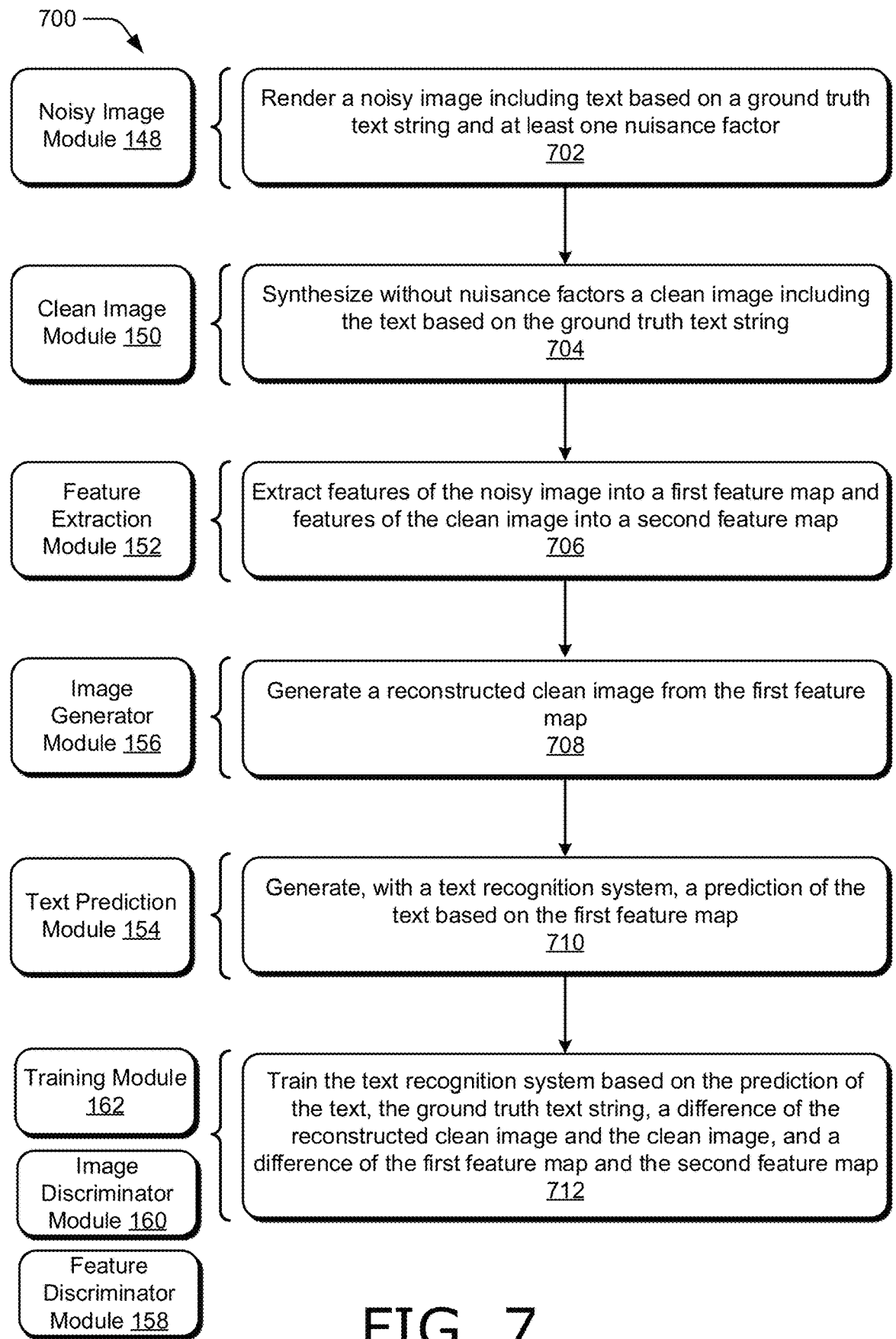
FIG. 7 illustrates a flow diagram depicting an example procedure in accordance with one or more aspects of the disclosure.

FIG. 7 illustrates an example procedure 700 for recognizing text in images in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 104 or server 108 of FIG. 1 that makes use of a text recognition system, such as system 400 in FIG. 4, or text recognition system 110 in FIG. 1. A text recognition system implementing procedure 700 may be an independent application that has been installed on the computing device, a service hosted by a service provider that is accessible by the computing device, a plug-in module to the computing device, or combinations thereof.

A noisy image including text is rendered based on a ground truth text string and at least one nuisance factor (block 702). In one example, noisy image module 148 renders a noisy image including text based on a ground truth text string and at least one nuisance factor.

A clean image without nuisance factors including the text is synthesized based on the ground truth text string (block 704). In one example, clean image module 150 synthesizes without nuisance factors a clean image including the text based on the ground truth text string.

Features of the noisy image are extracted into a first feature map and features of the clean image are extracted into a second feature map (block 706). In one example, feature extraction module 152 extracts features of the noisy image into a first feature map and features of the clean image into a second feature map.

A reconstructed clean image is generated from the first feature map (block 708). In one example, image generator module 156 generates a reconstructed clean image from the first feature map.

A prediction of the text is generated with a text recognition system based on the first feature map (block 710). In one example, text prediction module 154 is included in a text recognition system and generates a prediction of the text based on the first feature map.

The text recognition system is trained based on the prediction of the text, the ground truth text string, a difference of the reconstructed clean image and the clean image, and a difference of the first feature map and the second feature map (block 712). In one example, training module 162, image discriminator module 160, and feature discriminator module 158 train the text recognition system based on the prediction of the text, the ground truth text string, a difference of the reconstructed clean image and the clean image, and a difference of the first feature map and the second feature map.

Additionally or alternatively, training the text recognition system can be based on a loss constructed from a weighted sum of a feature-matching loss term determined from the difference of the first feature map and the second feature map, a feature adversarial loss term determined from respective binary labels for the first feature map and the second feature map, an image-reconstruction loss term determined from the difference of the reconstructed clean image and the clean image, an image adversarial loss term determined from additional respective binary labels for the reconstructed clean image and the clean image, and a training loss term determined from a conditional probability of the ground truth text string given the prediction of the text.

The procedures described herein constitute an improvement over procedures that do not train text recognition systems using clean images as conditional inputs. Rather, the procedures described herein train text recognition systems using both noisy images of text and a corresponding clean image. A clean image acts as supervision at both feature and pixel levels, so that a text recognition system is trained to be feature invariant (e.g., by requiring features extracted from a noisy image to match features extracted from a clean image), and feature complete (e.g., by requiring that features extracted from a noisy image be sufficient to generate a clean image). At the feature level, a feature discriminator is adversarially trained against a feature encoder. At the pixel level, an image discriminator is adversarially trained against a feature encoder and image generator. The image discriminator generates a confidence score that indicates a quality of text prediction across a dimension (e.g., horizontally) of the prediction of the text, and can be used to detect and correct errors in a prediction of text.

Accordingly, text recognition systems trained by the procedures described herein are not limited to recognizing text in an image that corresponds to text of a training image, but can generalize to text not included in training images, since the text recognition systems are trained to be feature complete. Moreover, text recognition systems trained by the procedures described herein are robust to nuisance factors, since the text recognition systems are trained to be feature invariant. Furthermore, since a clean image is provided as supervision at feature and pixel levels using adversarially-trained discriminators, a text recognition system trained by the procedures described herein can be trained using fewer training images than text recognition systems that are not trained with a supervisory clean image, thus saving time and resources.

Having considered example procedures in accordance with one or more implementations, consider now example systems and devices that can be utilized to practice the inventive principles described herein.

Example Systems and Devices

FIG. 8 illustrates an example system generally at 800 that includes example computing devices 802-1, 802-2, 802-3, 802-4, 802-5, and 802-6 (collectively 802) that is representative of one or more computing systems and devices that may implement the various techniques described herein. Computing devices 802 can be any suitable computing device (e.g., user computing devices). Computing devices 802 may be, for example, a user computing device (e.g., one of computing devices 104), or a server device, (e.g., server 108). Furthermore, computing device 802 may include an on-chip system, multiple computing devices, combinations thereof, or any other suitable computing device or computing system. Accordingly, FIG. 8 illustrates computing devices 802 as one or more of a tablet, a laptop computer, a smart phone, smart eye glasses, and a drone (e.g., a computing device of a drone), though these examples are illustrative and in no way are meant to limit the type or number of devices included in computing device 802.

Furthermore, computing devices 802 are coupled to "cloud" 804 including platform 806 that is representative of one or more computing systems and devices that may implement the various techniques described herein, such as servers, edge servers, global servers, or combinations thereof. This is illustrated through inclusion of text recognition application 112, detection application 166, text recognition system 110, text system 118, server 108, and system 400, in modules of platform 806, which operate as described above.

Functionality of computing devices 802 may be implemented all or in part through use of a distributed system, such as over a "cloud" 804 via a platform 806. Furthermore, platform 806 may host data accessible by computing devices 802, and therefore computing devices 802 may be required to be authenticated to platform 806.

Platform 806 includes a processing system 808, one or more computer-readable media 810, and one or more I/O interfaces 812 that are communicatively coupled to each other. Although not shown, platform 806 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 808 is representative of functionality to perform one or more operations using hardware. Accordingly, processing system 808 is illustrated as including hardware elements 814 that may be configured as processors, functional blocks, and so forth. This may include implementation in hardware as an application specific integrated circuit or other logic device formed using one or more semiconductors. Hardware elements 814 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 126 in FIG. 1 are examples of processing system 808.

Computer-readable media 810 (e.g., computer-readable storage media) is illustrated as including memory/storage 816. Storage 128 in FIG. 1 is an example of memory/storage included in memory/storage 816. Memory/storage component 816 may include volatile media (such as random access memory (RAM)), nonvolatile media (such as read only memory (ROM), Flash memory, optical disks, magnetic disks, and so forth), or combinations thereof. Memory/storage component 816 may include fixed media (e.g., RAM, ROM, a fixed hard drive, and so on) as well as removable media (e.g., Flash memory, a removable hard drive, an optical disc, and so forth). Computer-readable media 810 may be configured in a variety of other ways as further described below.

Input/output interface(s) 812 are representative of functionality to allow a user (e.g., a system administrator of platform 806) to enter commands and information to platform 806, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, platform 806 may be configured in a variety of ways as further described below to support user interaction.

Platform 806 also includes applications 818. Applications 818 are representative of any suitable applications capable of running on platform 806, and may include a web browser which is operable to access various kinds of web-based resources (e.g., assets, media clips, images, content, configuration files, services, user profiles, advertisements, coupons, and the like. Applications 818 include text recognition application 112 and detection application 166, as previously described. Furthermore, applications 818 includes any applications supporting text recognition system 110, text system 118, or system 400.

Cloud 804 includes and is representative of a platform 806. Platform 806 abstracts underlying functionality of hardware (e.g., servers) and software resources of cloud 804, and includes resources 820. Resources 820 may include applications, data, services, and content that can be utilized while computer processing is executed on servers that are remote from computing devices 802. Resources 820 can also include services provided over the Internet, through a subscriber network, such as a cellular or Wi-Fi network, or combinations thereof.

Resources 820 include recognition system store 822, which operates to provide one or more pre-trained text recognition systems to one of computing devices 802. Resources 820 also includes training dataset store 824, which operates to provide one or more training datasets of images that can be used to train a text recognition system as described herein.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by platform 806. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the platform 806, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 814 and computer-readable media 810 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 814, or combinations thereof. Platform 806 may be configured to implement particular instructions and functions corresponding to the software and hardware modules. Accordingly, implementation of a module that is executable by platform 806 as software may be achieved at least partially in hardware, e.g., through use of computer-readable storage media and hardware elements 814 of processing system 808. The instructions and functions may be executable/operable by one or more articles of manufacture (for example, processing system 808) to implement techniques, modules, and examples described herein.

Conclusion

In one or more implementations, a digital medium environment includes at least one computing device. Systems, techniques, and devices are described herein for training a text recognition system to recognize text in images using both noisy images of text that have nuisance factors applied, and a corresponding clean image (e.g., without nuisance factors). A clean image acts as supervision at both feature and pixel levels, so that a text recognition system is trained to be feature invariant (e.g., by requiring features extracted from a noisy image to match features extracted from a clean image), and feature complete (e.g., by requiring that features extracted from a noisy image be sufficient to generate a clean image). Accordingly, text recognition systems can generalize to text not included in training images, and are robust to nuisance factors. Furthermore, since a clean image is provided as supervision at feature and pixel levels, training a text recognition system requires fewer training images than text recognition systems that are not trained with a supervisory clean image, thus saving time and resources.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to train text recognition in images, a method implemented by a computing device, the method comprising:

obtaining a noisy image including text having at least one nuisance factor applied that alters a visual appearance of the text;

determining a clean image including the text without nuisance factors;

extracting features of the noisy image into a first feature map and features of the clean image into a second feature map;

generating a reconstructed clean image from the first feature map;

generating, by a text recognition system of the computing device, a prediction of the text from the first feature map corresponding to the noisy image; and training the text recognition system based on the prediction of the text, a difference of the reconstructed clean image and the clean image, and a difference of the first feature map corresponding to the noisy image and the second feature map corresponding to the clean image.

2. The method as described in claim 1, wherein the noisy image is obtained by synthesizing the noisy image according to one or more of the nuisance factors based on a ground truth text string.

3. The method as described in claim 1, wherein the clean image is determined by removing the at least one nuisance factor from the noisy image to form the clean image.

4. The method as described in claim 1, wherein the clean image is determined by synthesizing the clean image without the nuisance factors based on a ground truth text string.

5. The method as described in claim 1, further comprising:
extracting first features from the noisy image with a feature encoder of the text recognition system; and
extracting second features from the clean image with the feature encoder, wherein the training includes updating the feature encoder based on a feature-matching loss term determined from a difference between the first features and the second features.

6. The method as described in claim 5, wherein the updating further comprises:
providing the first features to a feature discriminator to assign a first binary label for the first features;
providing the second features to the feature discriminator to assign a second binary label for the second features;
forming a feature adversarial loss term based on the first binary label and the second binary label; and
training the feature encoder adversarially against the feature discriminator based on the feature adversarial loss term.

7. The method as described in claim 1, further comprising:
extracting the features from the noisy image with a feature encoder of the text recognition system; and
generating the reconstructed clean image with an image generator from the features, wherein the training includes updating the feature encoder jointly with the image generator based on an image-reconstruction loss term determined from the difference between the reconstructed clean image and the clean image.

8. The method as described in claim 7, wherein the updating further comprises:
providing the reconstructed clean image to an image discriminator to assign a first binary label for the reconstructed clean image;
providing the clean image to the image discriminator to assign a second binary label for the clean image;
forming an image adversarial loss term based on the first binary label and the second binary label; and training the feature encoder and the image generator adversarially against the image discriminator based on the image adversarial loss term.

9. The method as described in claim 1, further comprising extracting the features from the noisy image into the first feature map with a feature encoder of the text recognition system, wherein a text decoder of the text recognition system generates the prediction of the text from the noisy image based on the first feature map, the training further including updating the feature encoder and the text decoder jointly based on a training loss term determined from a conditional probability of a ground truth text string given the prediction of the text.

10. The method as described in claim 1, further comprising providing at least part of the trained text recognition system to a different device than the computing device for recognizing a text occurrence of the text in one or more images.

11. In a digital medium environment to train text recognition in images, a system including modules implemented at least partially in computer hardware, comprising:
a noisy image module to obtain a noisy image including text based on a ground truth text string and at least one nuisance factor;
a clean image module to determine a clean image including the text without nuisance factors;
a feature extraction module to extract features of the noisy image into a first feature map and extract features of the clean image into a second feature map;
a text prediction module to generate a prediction of the text based on the first feature map; and
a training module to train the feature extraction module and the text prediction module to recognize image text based on the prediction of the text, the ground truth text string, and a difference of the second feature map corresponding to the clean image and the first feature map corresponding to the noisy image.

12. The system as described in claim 11, wherein:
the noisy image module is configured to synthesize the noisy image according to one or more of the nuisance factors based on the ground truth text string; and
wherein, to determine the clean image, the clean image module is configured to:
remove at least one of the one or more nuisance factors from the noisy image to form the clean image; or
synthesize the clean image without the nuisance factors based on the ground truth text string in a standard font.

13. The system as described in claim 11, wherein:
the feature extraction module is configured to extract additional features from the clean image; and
to train the feature extraction module includes the training module configured to update a feature encoder based on a feature-matching loss term determined from a difference between the features and the additional features.

14. The system as described in claim 13, further comprising a feature discriminator module configured to:
receive the features and the additional features extracted from the clean image; and
assign respective binary labels for the features and the additional features, wherein the training module is configured to train the feature extraction module adversarially against the feature discriminator module based on a feature adversarial loss term determined from the respective binary labels.

15. The system as described in claim 11, further comprising an image generator module configured to generate a reconstructed clean image from the first feature map, wherein the training module is configured to update the feature extraction module jointly with the image generator module based on an image-reconstruction loss term determined from a difference between the reconstructed clean image and the clean image.

16. The system as described m claim 15, further comprising an image discriminator module configured to:
  receive the reconstructed clean image and the clean image; and
  assign respective binary labels for the reconstructed clean image and the clean image, wherein the training module is configured to train the feature extraction module and the image generator module adversarially against the image discriminator module based on an image adversarial loss term determined from the respective binary labels.

17. The system as described in claim 16, wherein the image discriminator module is configured to generate a confidence score from the image adversarial loss term that indicates a quality of the prediction of the text across a dimension of the prediction of the text.

18. The system as described in claim 11, wherein to train the feature extraction module and the text prediction module, the training module is configured to update the feature extraction module and the text prediction module jointly based on a training loss term determined from a conditional probability of the ground truth text string given the prediction of the text.

19. In a digital medium environment to train text recognition in images, a method implemented by a computing device, the method comprising:
  a step for rendering a noisy image including text based on a ground truth text string and at least one nuisance factor;
  a step for synthesizing without nuisance factors a clean image including the text based on the ground truth text string;
  a step for extracting features of the noisy image into a first feature map and features of the clean image into a second feature map;
  a step for generating a reconstructed clean image from the first feature map;
  a step for generating, with a text recognition system, a prediction of the text based on the first feature map; and
  a step for training the text recognition system based on the prediction of the text, the ground truth text string, a difference of the reconstructed clean image and the clean image, and a difference of the first feature map and the second feature map.

20. The method as described in claim 19, wherein the training the text recognition system is further based on a loss constructed from a weighted sum of:
  a feature-matching loss term determined from the difference of the first feature map and the second feature map;
  a feature adversarial loss term determined from respective binary labels for the first feature map and the second feature map;
  an image-reconstruction loss term determined from the difference of the reconstructed clean image and the clean image;
  an image adversarial loss term determined from additional respective binary labels for the reconstructed clean image and the clean image; and
  a training loss term determined from a conditional probability of the ground truth text string given the prediction of the text.

* * * * *